United States Patent
Tagami

(10) Patent No.: US 10,475,478 B2
(45) Date of Patent: Nov. 12, 2019

(54) MAGNETIC DISK DEVICE AND METHOD FOR CORRECTING POSITON OF HEAD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Naoki Tagami, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/055,851

(22) Filed: Aug. 6, 2018

(65) Prior Publication Data
US 2019/0287560 A1 Sep. 19, 2019

(30) Foreign Application Priority Data
Mar. 15, 2018 (JP) .................................. 2018-048493

(51) Int. Cl.
G11B 5/09 (2006.01)
G11B 5/596 (2006.01)
G11B 20/12 (2006.01)
G11B 20/10 (2006.01)

(52) U.S. Cl.
CPC ...... *G11B 5/59655* (2013.01); *G11B 5/59627* (2013.01); *G11B 5/59688* (2013.01); *G11B 20/10388* (2013.01); *G11B 20/12* (2013.01); *G11B 2020/1281* (2013.01)

(58) Field of Classification Search
None
See application file for complete search history.

(56) References Cited

U.S. PATENT DOCUMENTS

| | | | |
|---|---|---|---|
| 5,365,458 A * | 11/1994 | Tamura | G01B 7/312 700/279 |
| 7,312,946 B2 | 12/2007 | Asakura et al. | |
| 8,625,230 B2 | 1/2014 | Kosugi et al. | |
| 8,848,303 B1 | 9/2014 | Yamada | |
| 8,891,194 B1 | 11/2014 | Chu et al. | |
| 9,230,584 B1 | 1/2016 | Kosugi et al. | |
| 9,286,926 B1 | 3/2016 | Dhanda et al. | |
| 9,311,940 B1 * | 4/2016 | Kharisov | G11B 5/59627 |
| 9,401,167 B2 | 7/2016 | Pokharel et al. | |
| 9,502,062 B1 | 11/2016 | Dorobantu et al. | |

(Continued)

FOREIGN PATENT DOCUMENTS

| | | |
|---|---|---|
| JP | 2-246064 A | 10/1990 |
| JP | 2019-117672 A | 7/2019 |

*Primary Examiner* — Peter Vincent Agustin
(74) *Attorney, Agent, or Firm* — White & Case LLP

(57) ABSTRACT

According to one embodiment, a magnetic disk device, includes a disk including a track including a plurality of servo sectors, a head including a write head which writes data to the disk and a plurality of read heads which read the data from the disk, and a controller configured to simultaneously acquire a plurality of pieces of correction data for repeatable runout of the disk by the read heads, acquire a first correction data and a second correction data based on the correction data, write the first correction data and the second correction data to the disk, and correct a position of the head based on the first correction data and the second correction data.

19 Claims, 14 Drawing Sheets

(56) References Cited

U.S. PATENT DOCUMENTS

| | | |
|---|---|---|
| 9,799,360 B2 | 10/2017 | Tagami |
| 2005/0068650 A1* | 3/2005 | Annampedu ...... G11B 5/59627 360/39 |
| 2008/0175113 A1* | 7/2008 | Choi ................. G11B 5/59627 369/47.14 |
| 2015/0055239 A1 | 2/2015 | Hara |
| 2015/0302876 A1 | 10/2015 | Kashiwagi et al. |
| 2017/0263275 A1* | 9/2017 | Tagami ............. G11B 5/59627 |
| 2019/0198050 A1 | 6/2019 | Tagami et al. |

\* cited by examiner

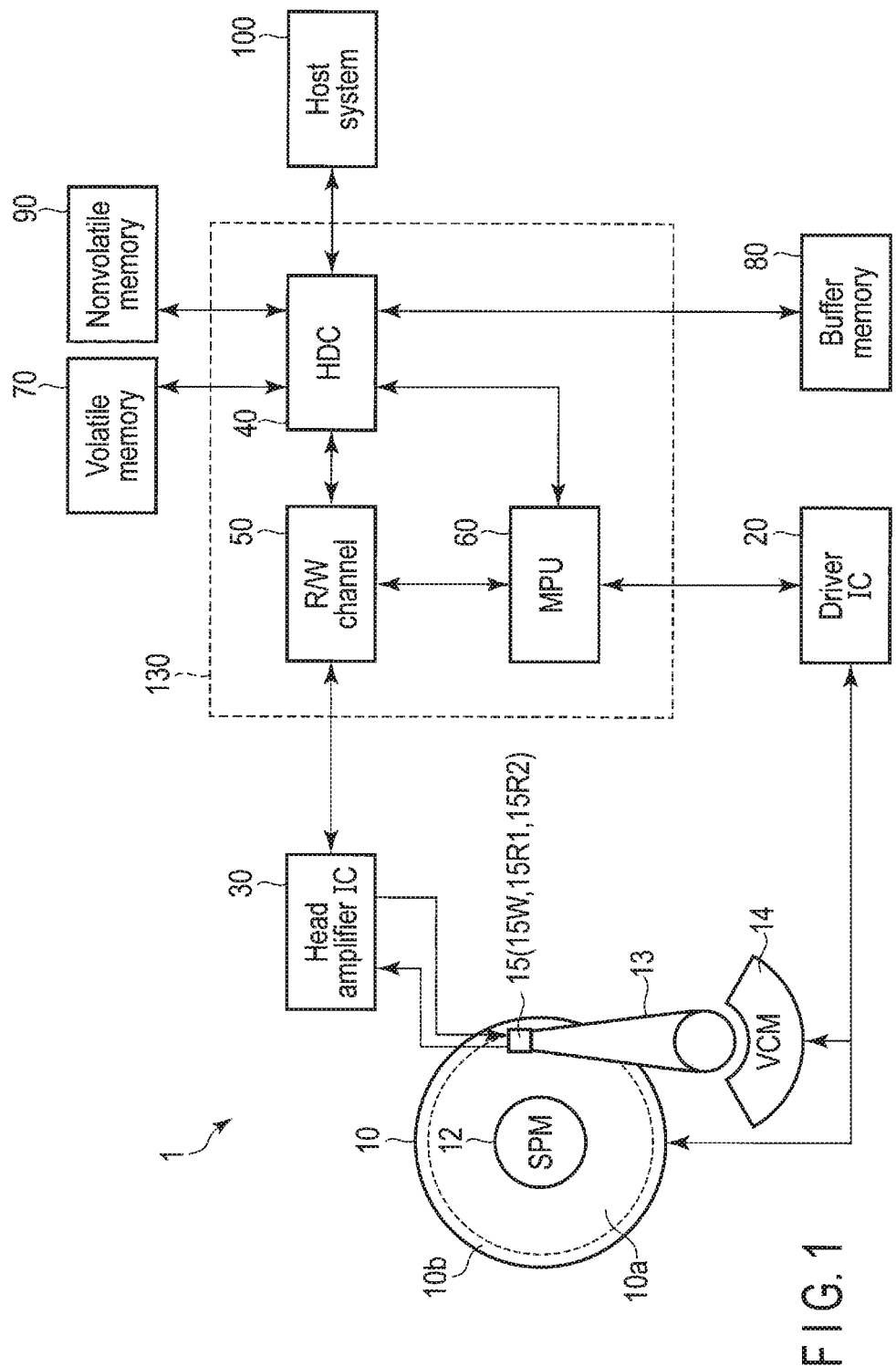
F I G. 1

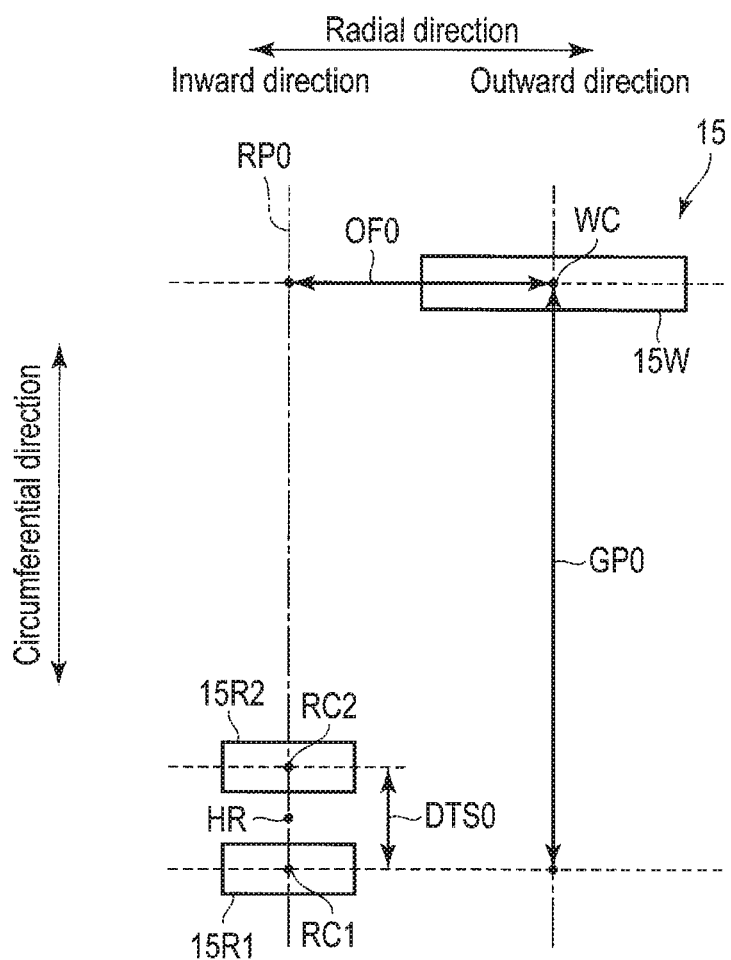
F I G. 3A

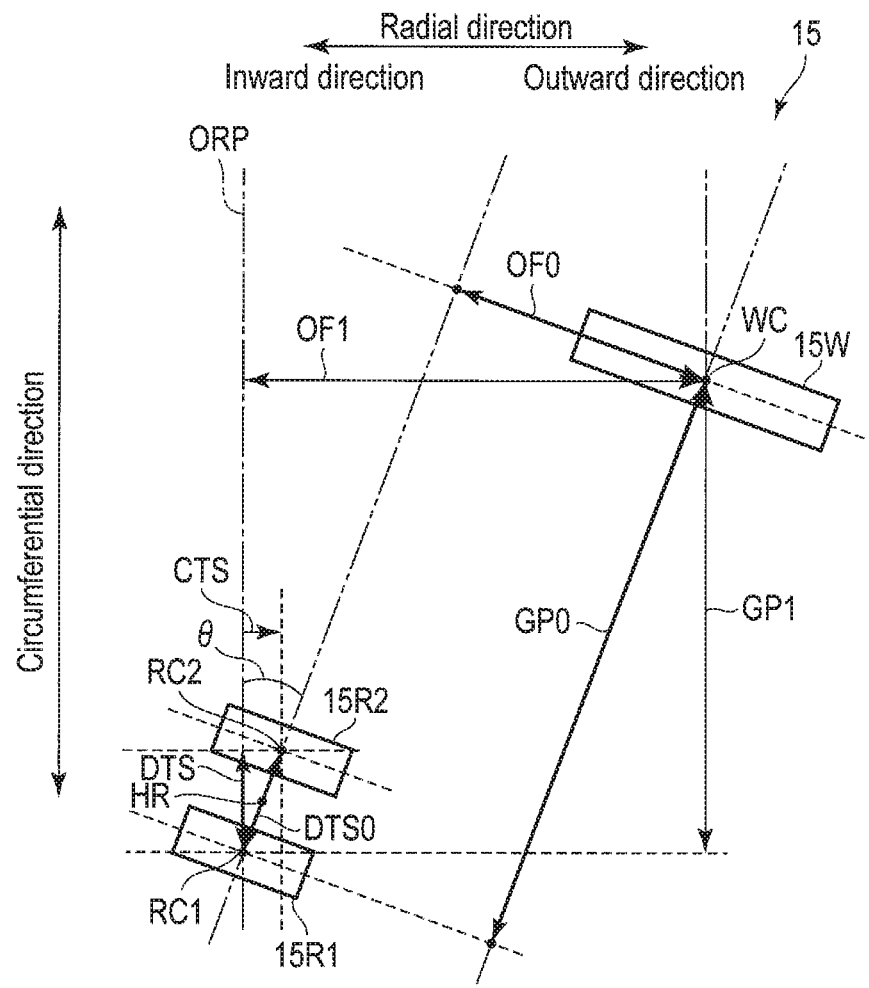
F I G. 3B

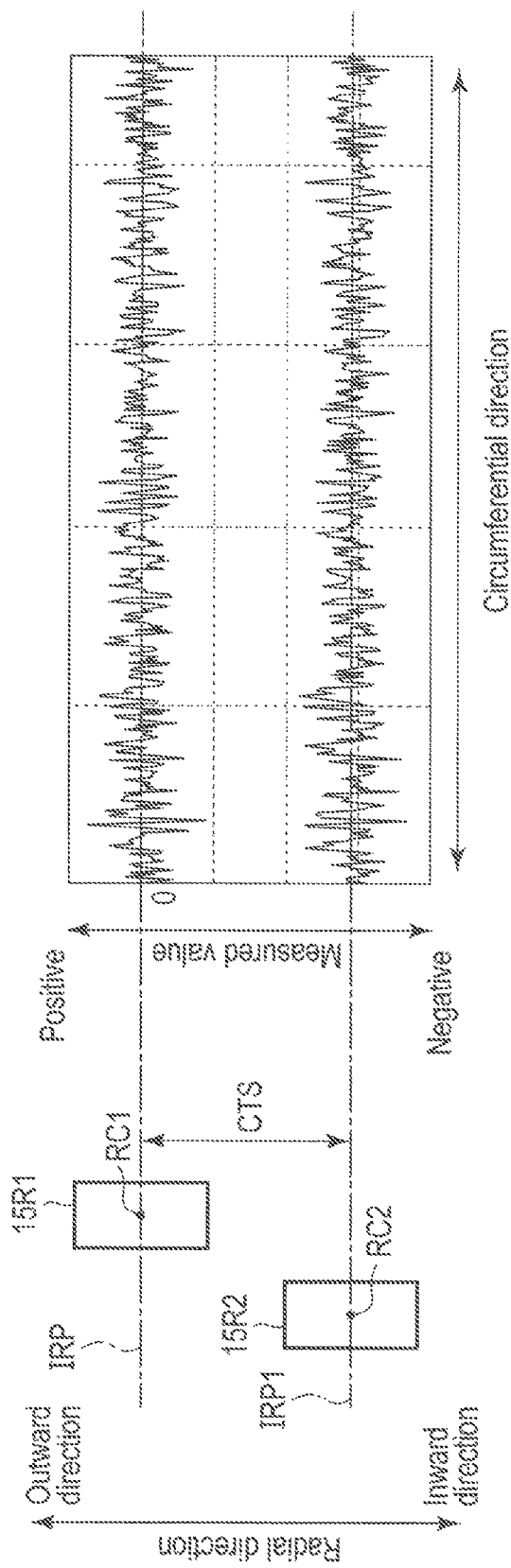
F I G. 6

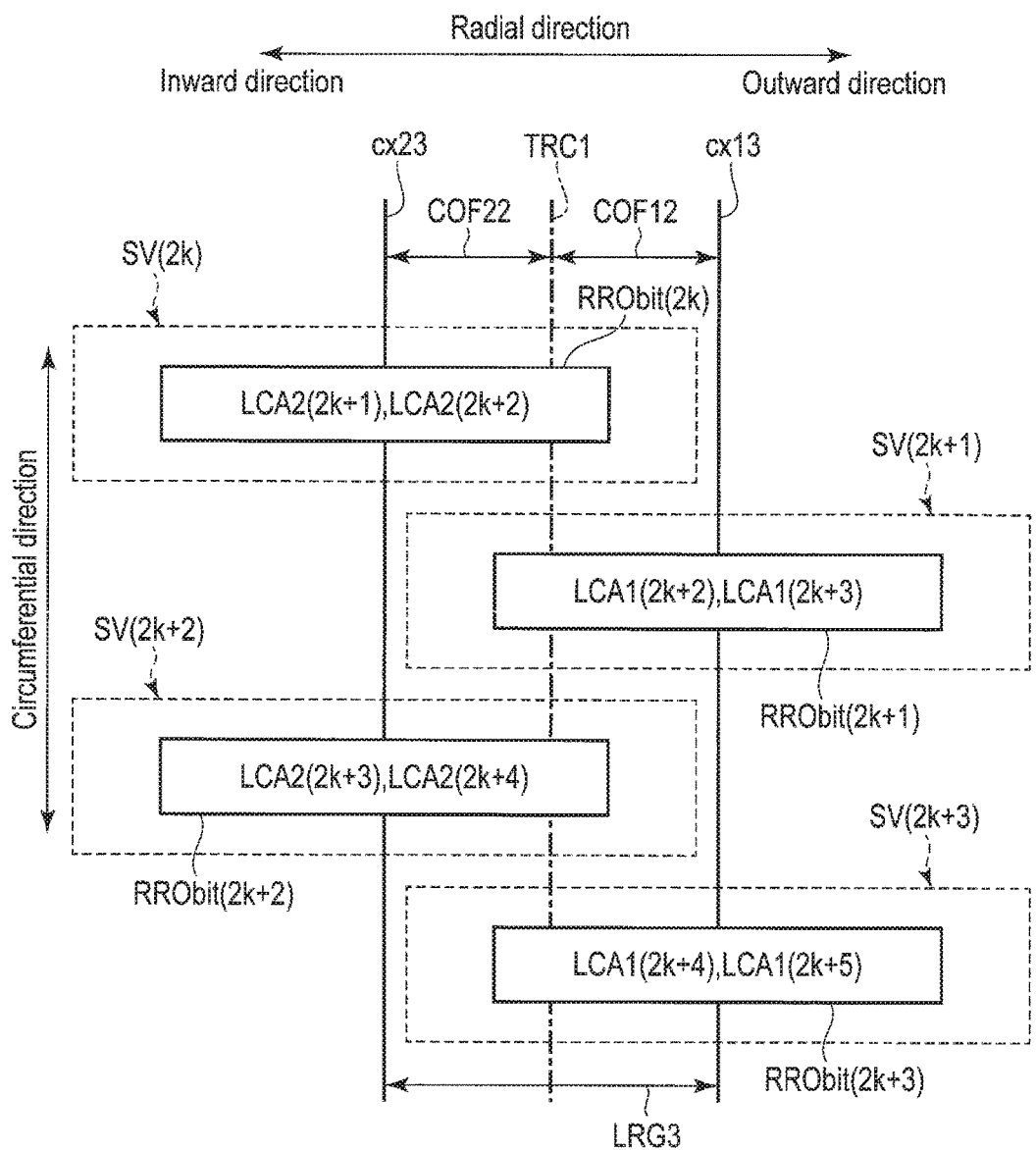
F I G. 9

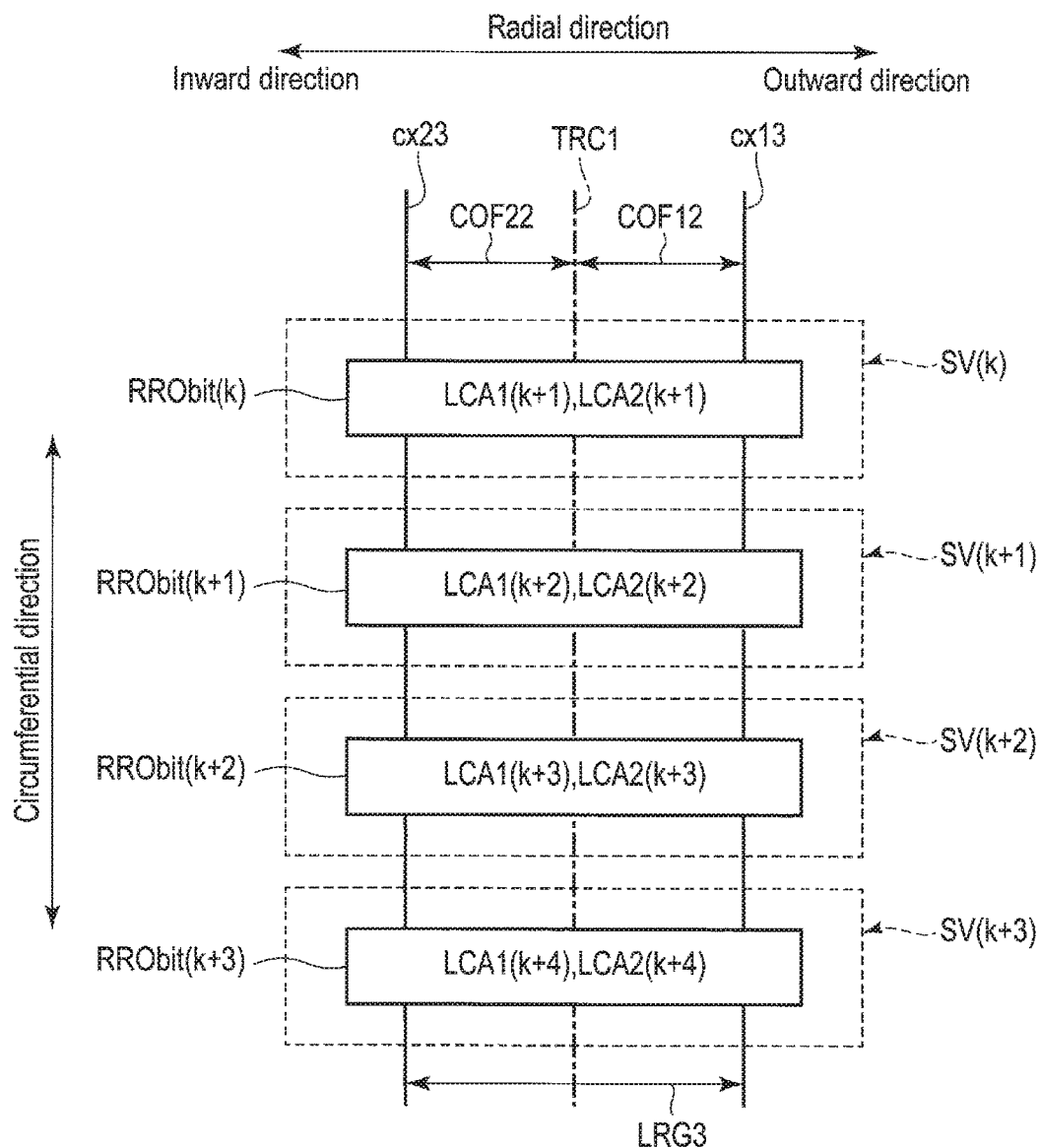
F I G. 10

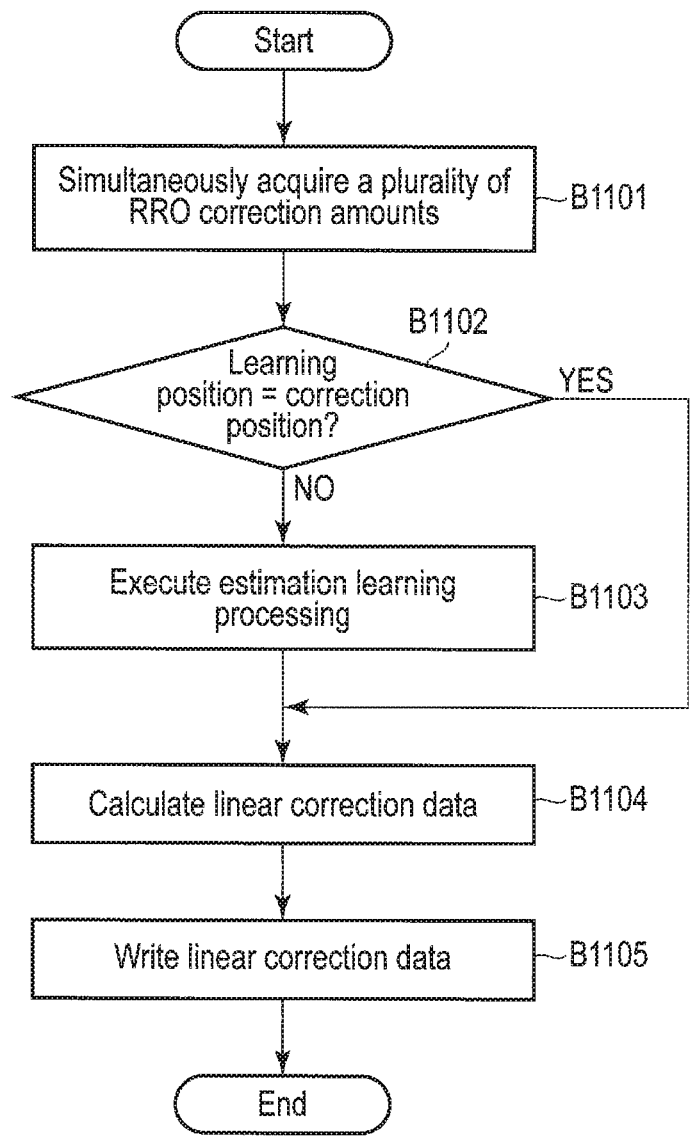
F I G. 11

MAGNETIC DISK DEVICE AND METHOD FOR CORRECTING POSITON OF HEAD

CROSS-REFERENCE TO RELATED APPLICATIONS

This application is based upon and claims the benefit of priority from Japanese Patent Application No. 2018-048493, filed Mar. 15, 2018, the entire contents of which are incorporated herein by reference.

FIELD

Embodiments described herein relate generally to a magnetic disk device and a method for correcting a position of a head.

BACKGROUND

In a magnetic disk device, technologies for correcting a position of a head by suppressing errors caused by repeatable runout (hereinafter, simply referred to as RRO) have been developed. For example, there is a method for correcting a position of a head based on data obtained by measuring RRO at a plurality of different positions in a radial direction of a disk and interpolating the measured RRO between a plurality of pieces of data. In the method for correcting a position of a head, the RRO is measured at the different positions in the radial direction of the disk, such that it is likely to increase the time taken to measure the RRO as a TPI of the disk increases. On the other hand, in recent years, two-dimensional magnetic recording (TDMR) type magnetic disk device having a plurality of read heads has been developed.

BRIEF DESCRIPTION OF THE DRAWINGS

FIG. 1 is a block diagram showing a configuration of a magnetic disk device according to an embodiment;

FIG. 3A is a diagram showing an example of a geometrical arrangement of a write head and two read heads when the read heads are located at a reference position shown in FIG. 2;

FIG. 3B is a diagram showing an example of the geometrical arrangement of the write head and the two read heads when the read heads are located at a radial position shown in FIG. 2;

FIG. 6 is a diagram showing an example in a case in which a plurality of read heads simultaneously execute RRO learning;

FIG. 9 is a diagram showing an example of an arrangement of RRObits according to an embodiment;

FIG. 10 is a diagram showing an example of an arrangement of RRObits according to an embodiment; FIG. 11 is a flowchart showing an example of a method for correcting a head position according to an embodiment;

DETAILED DESCRIPTION

Figure 2:
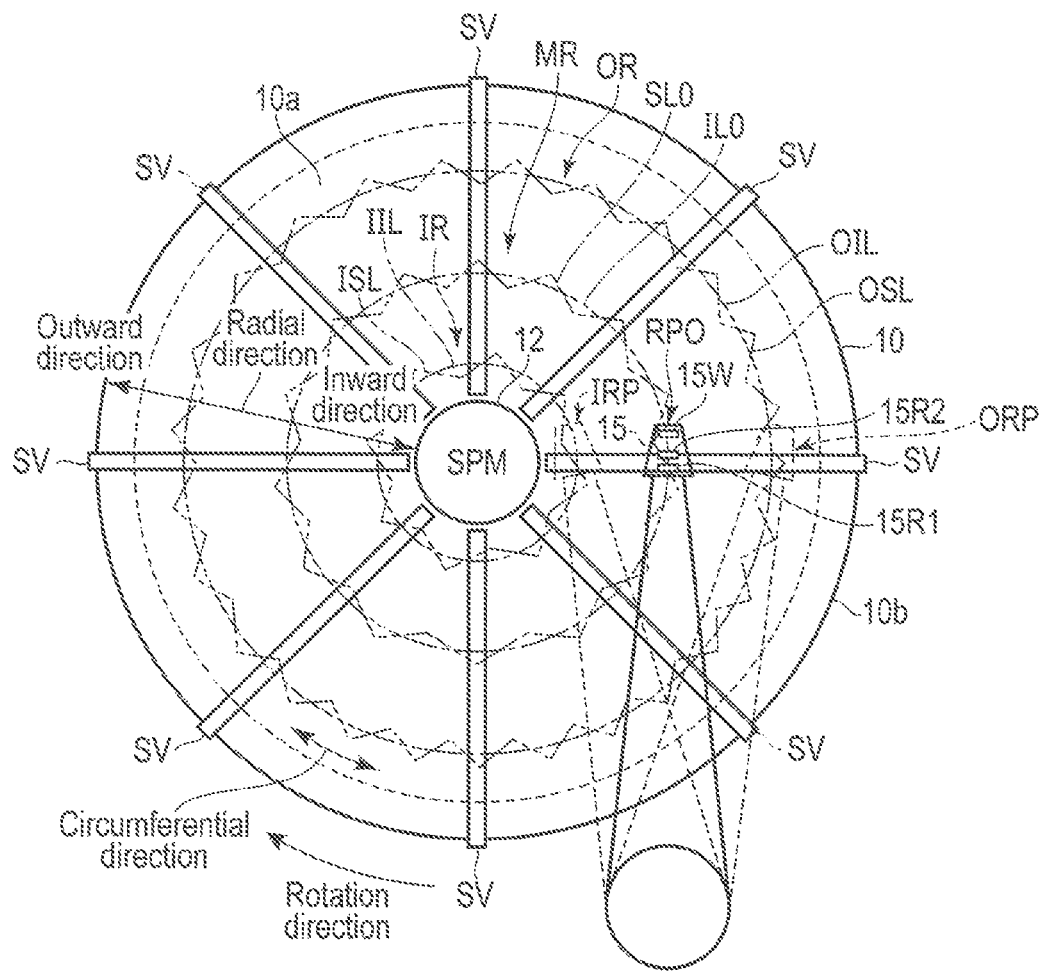
FIG. 2 is a schematic diagram showing an example of an arrangement of a head with respect to a disk according to an embodiment.

In general, according to one embodiment, a magnetic disk device, comprises: a disk comprising a track comprising a plurality of servo sectors; a head comprising a write head which writes data to the disk and a plurality of read heads which read the data from the disk; and a controller configured to simultaneously acquire a plurality of pieces of correction data for repeatable runout of the disk by the read heads, acquire a first correction data and a second correction data based on the correction data, write the first correction data and the second correction data to the disk, and correct a position of the head based on the first correction data and the second correction data.

According to another embodiment, a method for correcting a position of a head applied to a magnetic disk device which comprises a disk comprising a track comprising a plurality of servo sectors, a head comprising write head configured to write data onto the disk, and a plurality of read heads which read the data from the disk, the method comprises: simultaneously acquiring a plurality of pieces of correction data for repeatable runout of the disk by the read heads; acquiring a first correction data and a second correction data based on the correction data; writing the first correction data and the second correction data onto the disk; and correcting the position of the head based on the first correction data and the second correction data.

Hereinafter, embodiments of the present invention will be described with reference to the accompanying drawings. It is to be noted that drawings are one example and do not limit a scope of the present invention.

(Embodiment)

FIG. 1 is a block diagram showing a configuration of a magnetic disk device 1 according to an embodiment. The magnetic disk device 1 includes a head disk assembly (HDA), a driver IC 20, a head amplifier integrated circuit (hereinafter, head amplifier IC or preamplifier) 30, a volatile memory 70, a buffer memory (buffer) 80, a nonvolatile memory 90, and a system controller 130 which is an integrated circuit of one chip, which will be described later. In addition, the magnetic disk device 1 is connected to a host system (host) 100. The magnetic disk device 1 is, for example, a two-dimensional magnetic recording (TDMR) type magnetic disk device.

The HDA includes a magnetic disk (hereinafter, referred to as a disk) 10, a spindle motor (SPM) 12, an arm 13 on which the head 15 is mounted, and a voice coil motor (VCM) 14. The disk 10 is attached to a spindle motor 12, and rotates by driving the spindle motor 12. The arm 13 and the VCM 11 configure an actuator. The actuator drives the VCM 14 to control the head 15 mounted on the arm 13 to move to a particular radial position (hereinafter, simply referred to as "radial position") on the disk 10. Two or more disks 10 and heads 15 may be provided.

A user data region 10a usable by a user and a system area 10b for writing information necessary for system management are allocated to a recording region of the disk 10. Hereinafter, a direction along a circumference of the disk 10 will be referred to as a circumferential direction, and a direction orthogonal to the circumferential direction is referred to as a radial direction.

The head 15 comprises a write head 15W and a read head 15R mounted on a slider serving as a main body. The write head 15W writes data to the disk 10. The read heads 15R1 and 15R2 read data recorded to a data track on the disk 10. The read head 15R1 is provided, for example, at a position farthest from the write head 15W. The read head 15R2 is provided, for example, at the second farthest position, which is after the read head 15R1, from the write head 15W. It is to be noted that three or more read heads may be provided. Hereinafter, for convenience of explanation, the data written to the track on the disk 10 may be simply referred to as a track. Hereinafter, the magnetic disk device 1 will be described on the assumption that the head 15 is positioned at a particular radial position on the disk 10 or a particular track with respect to the read head 15R1. The magnetic disk device 1 may position the head 15 with respect to the read head other than the read head 15R1, for example, the read head 15R2.

FIG. 2 is a schematic diagram showing an example of the arrangement of the head 15 with respect to the disk 10 according to an embodiment. Referring to FIG. 2, in the radial direction, a direction toward an outer circumference of the disk 10 is referred to as an outward direction (outer side), and a direction opposite to the outward direction is referred to as an inward direction (inner side) of the disk 10. Also, FIG. 2 shows a rotation direction of the disk 10. It is to be noted that the rotation direction of the disk 10 may be opposite to the direction shown in the FIG. 2. In FIG. 2, the user data region 10a is divided into an inner circumferential region IR located in the inward direction, an outer circumferential region OR located in the outer direction, and a middle circumferential region MR located between the inner circumferential region IR and the outer circumferential region OR. FIG. 2 shows a radial position IRP, a radial position RP0, and a radial position ORP. The radial position IRP is located more inwardly than the radial position RP0, and the radial position ORP is located more outwardly than the radial position RP0. In FIG. 2, the radial position RP0 is in the middle circumferential region MR, the radial position ORP is in the outer circumferential region OR, and the radial position IRP is in the inner circumferential region IR. It is to be noted that the radial position RP0 may be in the outer circumferential region OR and in the inner circumferential region IR. The radial position IRP, the radial position RP0, and the radial position ORP each correspond to a central position (hereinafter, referred to as a track center) IIL of a radial width (hereinafter, simply referred to as a width) of a particular track of the inner circumferential region IR, a track center ILO of a particular track of the middle circumferential region MR, and a track center OIL of a particular track of the outer circumferential region OR. The track centers IIL, ILO, and OIL each correspond to trajectories (hereinafter, sometimes referred to as target trajectory) of the targeted head 15 when the head 15 is positioned at the radial positions IRP, RP0 and ORP. For example, each of the track centers IIL, IL0, and OIL is a true circle which is concentric with the disk 10. In addition, FIG. 2 shows trajectories ISL, SL0 and OSL of the head 15 deviated with respect to the track centers IIL, IL0, and OIL, respectively, due to the repeatable runout (RRO).

The disk 10 includes a plurality of servo regions SV. Hereinafter, the servo region SV may be referred to as a servo sector. The plurality of servo regions SV extend radially in the radial direction of the disk 10 and is discretely disposed in the circumferential direction at a particular interval. The servo region SV includes a servo data for positioning of the head 15 at the particular radial position of the disk 10 and an RRO correction data.

The servo data includes, for example, a servo mark, an address data, a burst data or the like. The address data includes an address (cylinder address) of a particular track and an address of a servo sector of a particular track. The burst data is a data (relative position data) used for detecting a position deviation (position error) in the radial direction of the head 15 with respect to the track center of the particular track, and includes a repeating pattern of a particular cycle. The burst data is written in zigzag across adjacent tracks to the outside. The burst data includes an error caused by a distortion of a track with respect to a true circular track (track center) which is caused by blurring (repeating run out) synchronized with the rotation of the disk 10 when the servo data is written on the disk. Hereinafter, for convenience of description, the error caused by the distortion of the track with respect to the track center caused by the RRO is simply referred to as the RRO.

A pattern (hereinafter, simply referred to as an RRO correction data) configuring the RRO correction data for correcting the RRO is written in each of the plurality of servo regions SV. The RRO correction data is a type of additional data of the servo data. The RRO correction data is used to correct the RRO of the servo data (more specifically, servo burst data in the servo data), that is, to correct distortion of the trajectory of the head 15 with respect to the track center. The RRO correction may be referred to as the true circle correction.

The RRO correction data includes an RRO preamble pattern, a synchronization pattern and a digital data (hereinafter, referred to as an RRO correction code (RRO code)) obtained by encoding a correction amount. The RRO preamble pattern and the synchronization pattern are used to detect a read start timing of the digital data obtained by encoding the correction amount to be written in the subsequent region. In this case, the RRO correction code (RRO code) configures a main part of the RRO correction data. The RRO correction data may he referred to as RRObit or PostCode.

When the head 15 is located at the radial position RP0, a skew angle becomes, for example, 0°. Hereinafter, the radial position RP0 may be referred to as a reference position RP0. When the head 15 is located at the radial position ORP, the skew angle becomes, for example, a positive value. When the head 15 is located at the radial position IRP, the skew angle becomes, for example, a negative value. If the head 15 is located at the radial position ORP, the skew angle may be a negative value. In addition, if the head 15 is located at the radial position IRP, the skew angle may be a positive value.

In the example shown in FIG. 2, when the head 15 is positioned at the radial position RP0, the head 15 corrects an operation to pass over the track center IL0 from the trajectory SL0 based on the servo data of the servo region SV on the disk 10. When the head 15 is positioned at the radial position ORP, the head 15 corrects an operation to pass over the track center OIL from the trajectory OSL based on the servo data of the servo region SV on the disk 10. When the head 15 is positioned at the radial position IRP, the head 15 corrects an operation to pass over the track center IIL from the trajectory ISL based on the servo data of the servo region SV on the disk 10.

FIG. 3A is a diagram showing an example of a geometrical arrangement of the write head 15W and the two read heads 15R1 and 15R2 when the read head 15R1 is located at the reference position RP0 shown in FIG. 2. Hereinafter, the geometrical arrangement of the write head 15W and the two read heads 15R1, 15R2 in the head 15 with respect to the position of the read head 15R1 will be described. FIG. 3A shows a central part WC of the write head 15W, a central part RC1 of the read head 15R1 and a central part RC2 of the read head 15R2. FIG. 3A shows a middle part HR between the central part RC1 of the read head 15R1 and the central part RC2 of the read head 15R2. A distance in a second direction Y between the central part RC1 of the read head 15R1 and the central part RC2 of the read head 15R2 is referred to as a down track separation (DTS), which is referred to as a longitudinal deviation for convenience of description.

In the example shown in FIG. 3A, when the read head 15R1 is located at the reference position RP0, the write head 15W is located at a position separated by a read/write (R/W) offset OF0 in the outward direction with respect to the read head 15R1. Hereinafter, the R/W offset OF0 is referred to as a reference offset OF0. In addition, the central part WC of the write head 15W is located at a position separated by read/write (R/W) gap GP0 in the circumferential direction with respect to the central part RC1 of the read head 15R1. The reference offset OF0 may be generated due to variations or the like during the manufacturing process. The reference offset OF0 may be 0 (zero), and may also be a value offset in an inward direction. The reference offset OF0 is, for example, on the order of several hundreds of nanometers (nm). In addition, the R/W gap GP0 is referred to as a reference gap GP0. The reference gap GP0 is, for example, on the order of several thousands of nanometers (nm).

In the example shown in FIG. 3A, when the central part RC1 of the read head 15R1 is located at the reference position RP0, the central part RC2 of the read head 15R2 is also located at the reference position RP0. In other words, when the central part RC1 of the read head 15R1 is located at the reference position RP0, the central part RC1 of the read head 15R1 and the central part RC2 of the read head 15R2 are aligned along the circumferential direction of the read head 15R1. The central part RC1 of the read head 15R1 is spaced apart from the central part WC of the write head 15W by the reference offset OF0 in the radial direction. The central part RC2 of the read head 15R2 is also spaced apart from the central part WC of the write head 15W by the reference offset OF0 in the radial direction. The central part RC2 of the read head 15R2 is spaced apart from the central part RC1 of the read head 15R1 by a longitudinal deviation DTS0 in the circumferential direction. Hereinafter, the longitudinal deviation DTS0 is referred to as a reference longitudinal deviation DTS0. The reference longitudinal deviation DTS0 is, for example, on the order of tens of nanometers. When the central part RC1 of the head 15R1 is located at the reference position RP0, the middle part HR is also located at the reference position RP0. Therefore, the middle part HR is spaced apart from the central part WC of the write head 15W by the reference offset OF0 in the radial direction. When the central part RC1 of the read head 15R1 is located at the radial position RP0, the central part RC1 of the read head 15R1 and the central part RC2 of the read head 15R2 may be slightly shifted from each other in the radial direction. Hereinafter, for convenience of description, the "central part of the read head (write head)" may be expressed by the "read head (write head)".

The head 15 moves to a particular radial position while tilting at a particular skew angle by driving the actuator in a state in which the geometrical arrangement of the write head 15W and the two read heads 15R1 and 15R2 shown in FIG. 3A is maintained.

FIG. 3B is a diagram showing an example of the geometrical arrangement of the write head 15W and the two read heads 15R1 and 15R2 in the case in which the read head 15R1 is located at the radial position ORP shown in FIG. 2. The radial distance between the central part RC1 of the read head 15R1 and the central part RC2 of the read head 15R2 is referred to as a cross track separation (CTS), which will be referred to as a lateral deviation for convenience of description.

In the example shown in FIG. 3B, when the read head 15R1 is located at the radial position ORP, the read head 15R2 is inclined outwardly at the skew angle θ with respect to the read head 15R1. Therefore, the read head 15R2 is spaced apart from the read head 15R1 in the radial direction by the lateral deviation CTS, and is spaced apart from the read head 15R1 by the longitudinal deviation DTS in the circumferential direction. The lateral deviation CTS varies depending on the skew angle θ. The read head 15R1 is spaced apart from the write head 15W in the radial direction by the R/W offset OF1, and spaced apart from the write head 15W in the circumferential direction by an R/W gap GP1. In addition, when the read head 15R1 is located at the radial position ORP, the middle part HR is spaced apart from the read head 15R1 by a lateral deviation CTS/2 in the radial direction, and spaced apart from the read head 15R1 by a longitudinal deviation DTS/2 in the circumferential direction.

Similar to the case in which the read head 15R1 is located at the radial position ORP, even when the read head 15R1 is located at the radial position IRP, the geometrical arrangement of the write head 15W and the two read heads 15R1 and 15R2 will be described based on the skew angle θ, the lateral deviation CTS, the reference longitudinal deviation DTS0, the reference gap GP0, and the reference offset OF0.

The driver IC 20 controls driving of an SPM12 and the VCM14 according to the control of the system controller 130 (more specifically, the MPU 60 to be described later).

The head amplifier IC (preamplfier) 30 includes a read amplifier and a write driver. The read amplifier amplifies a read signal read from the disk 10 and outputs the amplified read signal to the system controller 130 (more specifically, a read/write (R/W) channel 50). The write driver outputs a write current, which corresponds to the write data output from the R/W channel 50, to the head 15.

The volatile memory 70 is a semiconductor memory in which the stored data is lost if a power supply is cut off. The volatile memory 70 stores data and the like necessary for processing in each section of the magnetic disk device 1. The volatile memory 70 is, for example, a dynamic random access memory (DRAM) or a synchronous dynamic random access memory (SDRAM).

The buffer memory 80 is a semiconductor memory for temporarily recording data and the like transmitted and received between the magnetic disk device 1 and the host 100. It is to be noted that the buffer memory 80 is formed integrally with the volatile memory 70. An example of the buffer memory 80 may include a DRAM, a static random access memory (SRAM), an SDRAM, a ferroelectric random access memory (FeRAM), a magnetoresistive random access memory (MRAM) or the like.

The nonvolatile memory 90 is a semiconductor memory for recording the stored data even if the power supply is cut off. The nonvolatile memory 90 is, for example, a NOR type or NAND type flash read only memory (FROM).

The system controller (controller) 130 is realized by using, for example, a large scale integrated circuit (LSI) called a system-on-a-chip (SoC) in which a plurality of elements are integrated on a single chip. The system controller 130 includes a hard disk controller (HDC) 40, a read/write (R/W) channel 50, and a microprocessor (MPU) 60. The HDC 40, the R/W channel 50, and the MPU 60 each are electrically connected to each other. The system controller 130 is electrically connected to, for example, the driver IC 20, the head amplifier IC 30, the volatile memory 70, the buffer memory 80, the nonvolatile memory 90, the host system 100, and the like.

The HDC 40 controls a data transmission between the host 100 and the R/W channel 50 in response to an instruction from the MPU 60 to be described later. The HDC 40 is electrically connected to, for example, the volatile memory 70, the buffer memory 80, the nonvolatile memory 90 and the like.

The R/W channel 50 executes signal processing of the read data and the write data in response to the instruction from the MPU 60. The R/W channel 50 has a circuit or a function for measuring signal quality of the read data. The R/W channel 50 is electrically connected to, for example, the head amplifier IC 30 or the like.

The MPU 60 is a main controller that controls each section of the magnetic disk device 1. The MPU 60 controls the VCM 14 via the driver IC 20 to execute the servo control for positioning of the head 15. The MPU 60 selects a destination to save the write data transmitted from the host 100 while controlling the write operation of the data into the disk 10. In addition, the MPU 60 controls the processing of the read data transmitted from the disk 10 to the host 100 while controlling the read operation of data from the disk 10. The MPU 60 is connected to each section of the magnetic disk device 1. The MPU 60 is electrically connected to, for example, the driver IC 20, the HDC 40, the R/W channel 50 or the like.

Figure 4:
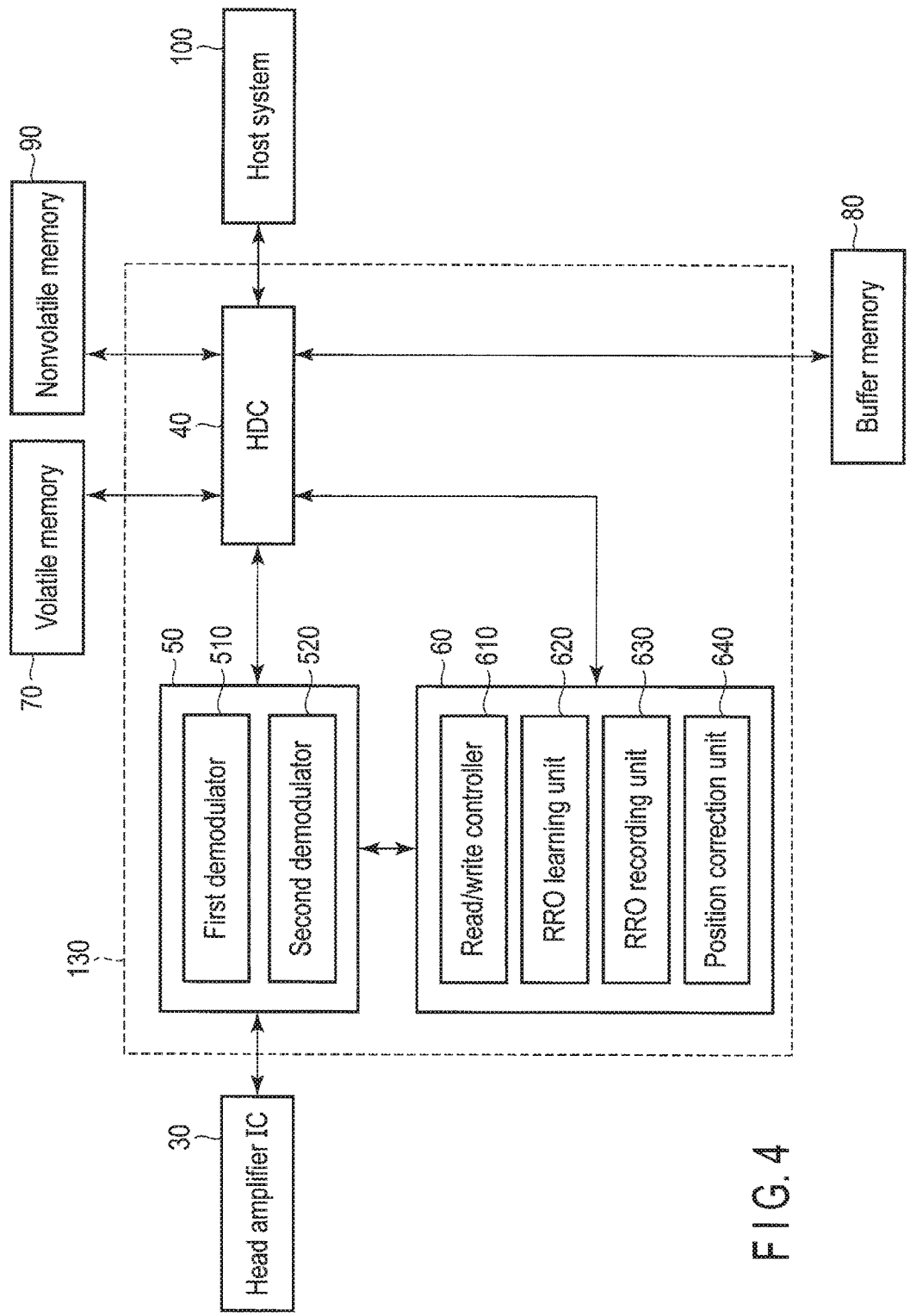
FIG. 4 is a block diagram showing a configuration example of an R/W channel and an MPU according to an embodiment.

FIG. 4 is a block diagram showing a configuration example of the R/W channel 50 and the MPU 60 according to the present embodiment. In FIG. 4, the disk 10, the head 15, the driver IC 20, the head amplifier IC 30 and the like are omitted.

The R/W channel 50 includes a first demodulator 510 and a second demodulator 520. For example, the first demodulator 510 demodulates data read by the read head 15R1, for example, the servo signal, and outputs the demodulated servo data to the MPU 60 or the like. Similar to the first demodulator 510, the second demodulator 520 demodulates the servo signal read by the read head 15R2 and outputs the demodulated servo data to the MPU 60 or the like. It is to be noted that when three or more read heads are provided, the R/W channel 50 may have three or more demodulators corresponding to each or the read heads.

The MPU 60 includes a read/write controller 610, an RRO learning unit 620, an RRO recording unit 630, and a position correction unit 640. The MPU 60 executes the processing of each section, for example, the read/write controller 610, the RRO learning unit 620, the RRO recording unit 630, the position correction unit 640 and the like on firmware. It is to be noted that the MPU 60 may include each section as circuits.

The read/write controller 610 controls the read processing and the write processing of data in response to a command from the host 100. The read/write controller 610 controls the VCM 14 via the driver IC 20 to position the head 15 at the particular radial position on the disk 10 and executes the read processing or the write processing. The read/write controller section 610 executes the read and write processing using at least one of the read heads 15R1 and 15R2. The read/write controller 610 can position the head at the particular radial position on the disk 10 and simultaneously executes the read/write processing by the read head 15R1 and the read head 15R2. Since the lateral deviation CTS differs at the radial position where the head 15 is positioned, the read/write controller 610 can control whether to execute the read/write processing by either of the read head 15R1 and the read head 15R2 according to the lateral deviation CTS or whether to execute the read/write processing by both of the read head 15R1 and the read head 15R2. It is to be noted that the read/write controller 610 may record the lateral deviation CTS at each radial position on the disk 10, the reference longitudinal deviation DTS0, the reference offset OF0, the reference gap GP0, and the like in the nonvolatile memory 90 or the system area 10b in association with the head 15.

The RRO learning unit 620 measures the difference (hereinafter, referred to as the RRO correction amount) between the target trajectory corresponding to the radial position where the head 15 is positioned and the radial position of the head 15 (the read head 15R1 and the read head 15R2) demodulated from the read servo data and executes the processing (hereinafter, sometimes referred to as RRO learning processing) of calculating the RRO correction data based on the measured RRO correction amount. The RRO learning process is executed, for example, at a test stage or a manufacturing stage of the magnetic disk device 1. Hereinafter, the "measuring the RRO correction amount" or the "calculating the RRO correction data based on the RRO correction amount" will be referred to as the "RRO learning". The "RRO learning" may include "to measure", "to read" or "to acquire" or the like. In some cases, the RRO correction amount and the RRO correction data may have the same meaning. The particular radial position at which the RRO learning is executed and the particular radial position at which the RRO learning has been executed may be referred to as a learning position. In addition, the RRO learning unit 620 can acquire positional information in the circumferential direction in which the RRO learning has been made. In addition, the RRO learning unit 620 may execute the RRO learning at some positions in the circumferential direction at the particular radial position or may also execute the RRO learning at all positions in the circumferential direction. In addition, the RRO learning unit 620 may execute the RRO learning at several radial positions or may execute the RRO learning at all the radial positions of the disk 10.

For example, the RRO learning unit 620 executes the RRO learning in accordance with an actual change in the RRO in the radial direction (hereinafter, simply referred to as a change in the RRO). In one example, a gradient of the change in the RRO varies from track to track. The RRO learning unit 620 executes the RRO learning for each radial region in which the gradient of the change in the RRO is constant, for example, a constant increase rate or a constant decrease rate, or the gradient of the change in the RRO is considered constantly. In other words, the RRO learning unit 620 predicts the change in the RRO correction amount in this region based on the two RRO correction amounts acquired at each of the two learning positions in the particular radial region to execute the RRO learning for each radial region (hereinafter, referred to as a linear possible region) in which the processing of correcting the radial position (hereinafter, simply referred to as the head position) of the head 15 can be executed. For example, the linear possible region is a region of the order of several nm to several tens of nanometers (nm). In one example, the linear possible region may be set for each region equal to or less than a width of half of one track in the radial direction. The RRO learning unit 620 executes the RRO learning at a radial position within a particular range from a radial start position of a particular linear possible region and a radial position within a particular range from a radial end position of the linear possible region. Hereinafter, the start position and the end position of the particular linear possible region are simply referred to as a boundary position. In addition, the radial position within the particular range from the boundary position is referred to as a correction position. Here, the correction position is the radial position at which the RRO learning can be executed on the RRO correction amount (hereinafter, referred to as "linear correction amount"), which can read the change in the RRO correction amount approximating the actual change in the RRO. The correction position includes the boundary position. The radial region between the two correction positions is referred to as a linear correction region. The linear possible region includes the linear correction region. It is to be noted that the RRO learning unit 620 may arbitrarily set the linear correction region, and may be recorded in a memory, for example, the nonvolatile memory 90, the system area 10*b* or the like. The RRO learning unit 620 may record information on the change in the RRO in the memory, for example, the non-volatile memory 90, the system area 10*b* or the like.

Figure 5:
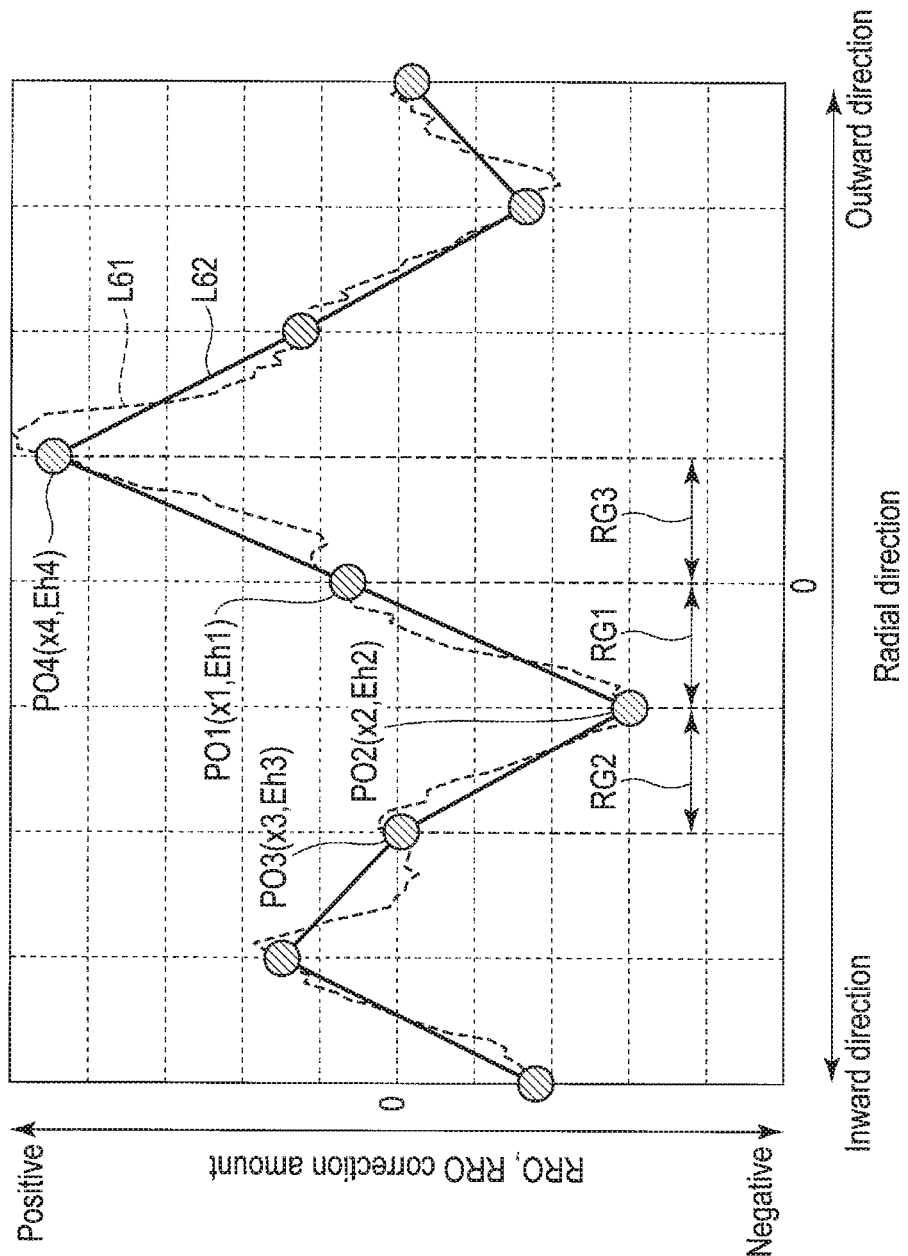
FIG. 5 is a view showing an example of a change in RRO in a radial direction of the disk.

FIG. 5 is a diagram showing an example of the change in the RRO in the radial direction of the disk 10. In FIG. 5, a vertical axis indicates the RRO and the RRO correction amount, and a horizontal axis indicates the radial direction. In FIG. 5, a broken line L61 indicates an example of a change L61 in RRO, and a line L62 indicates an example of a change L62 in RRO correction amount predicted by the linear RRO correction processing. FIG. 5 shows boundary positions (correction position) x1, x2, x3 and x4. A boundary position x1 is a radial position corresponding to the reference position RP0, a boundary position x2 is a radial position located further inside than the boundary position x1, a boundary position x3 is a radial position further inside than the boundary position x2, and the boundary position x4 is a radial position located further outwardly than the boundary position x1. In addition, FIG. 5 shows a linear possible region (linear correction region) RG1 from the boundary position x1 to the boundary position x2, a linear possible region (linear correction region) RG2 from the boundary position x2 to the boundary position x3, and a linear possible region (linear correction region) RG3 from the boundary position x1 to the boundary position x4. In FIG. 5, as shown in the broken line L61, the change in the RRO periodically fluctuates in the radial direction. In FIG. 5, each point indicates each RRO (RRO correction amount) corresponding to each of the boundary positions x1 to x4 of each linear possible region in the change L61 in the RRO. A point PO1 indicates RRO (RRO correction amount) Eh1 corresponding to the boundary position x1, a point PO2 indicates RRO (RRO correction amount) Eh2 corresponding to the boundary position x2, a point PO3 indicates RRO (RRO correction amount) Eh3 corresponding to the boundary position x3, and a point PO4 indicates RRO (RRO correction amount) Eh4 corresponding to the boundary position x4. In FIG. 5, the change L61 in the RRO substantially linearly changes in the linear possible region RG1 from the point PO1 to the point PO2. The change L61 in the RRO substantially linearly changes in the linear possible region RG2 from the point PO2 to the point PO3. The change L61 in the RRO substantially linearly changes in the linear possible region RG3 from the point PO1 to the point PO4.

In the example shown in FIG. 5, the RRO learning unit 620 executes the RRO learning on the RRO correction amount (linear correction amount) Eh1 at the boundary position (correction position) x1, the RRO correction amount (linear correction amount) Eh2 at the boundary position (correction position) x2, the RRO correction amount (linear correction amount) Eh3 at the boundary position (correction position) x3 and the RRO correction amount (linear correction amount) Eh4 at the boundary position (correction position) x4 by the read head 15R1 or 15R2.

In addition, the RRO learning unit 620 can simultaneously execute the RRO learning by the plurality of heads 15 (read heads). The RRO learning unit 620 simultaneously executes the RRO learning in the linear correction region by the read heads 15R1 and 15R2. In this case, the RRO learning unit 620 determines whether to simultaneously execute the RRO learning in the particular linear correction region by the read heads 15R1 and 15R2 based on the lateral deviation CTS. In other words, the RRO learning unit 620 determines whether to simultaneously execute the RRO learning by the read heads 15R1 and 15R2 depending on whether the read heads 15R1 and 15R2 can be arranged in the linear correction region. When the lateral deviation CTS is equal to or less than the linear correction region at the radial position at which the head 15 is positioned, the RRO learning unit 620 simultaneously executes the RRO learning by the read heads 15R1 and 15R2. When the lateral deviation CTS is larger than the linear correction region at the radial position at which the head 15 is positioned, the RRO learning unit 620 dose not simultaneously execute the RRO learning by the read heads 15R1 and 15R2. When the RRO learning is not simultaneously executed by the read heads 15R1 and 15R2, the RRO learning unit 620 positions either of the read heads 15R1 and 15R2 at the correction position to execute the RRO learning. In addition, even when the lateral CTS is 0 at the radial position at which the head 15 is positioned, the RRO learning unit 620 positions either of the read heads 15R1 and 15R2 at the correction position to execute the RRO learning. It is to be noted that when the lateral deviation CTS is larger than the linear correction region at the radial position at which the head 15 is positioned, the RRO learning unit 620 may simultaneously execute the RRO learning by the read heads 15R1 and 15R2. In addition, even when the lateral deviation CTS is 0 at the radial position at which the head 15 is positioned, the RRO learning unit 620 may simultaneously execute the RRO learning by the read heads 15R1 and 15R2 to average the data acquired by the RRO learning. The RRO learning unit 620 may also execute the RRO learning by three or more read heads in the linear correction region. In addition, when there are three or more read heads, the number of read heads in which the lateral deviation CTS is equal to or less than the linear correction region is selected in two, and the read heads may also execute the RRO learning simultaneously. When the repeated RRO learning is executed at the same radial position to improve RRO learning accuracy, the RRO learning unit 620 may execute the head position correction by the linear RRO rather than the RRO data which is already acquired and simultaneously execute the RRO learning by the read heads 15R1 and 15R2. In addition, the RRO learning may also execute while being changed to the learning position at which the immediately preceding simultaneous learning data can be used.

FIG. 6 is a diagram showing an example of a case in which the RRO learning is simultaneously executed by the plurality of read heads. In FIG. 6, a vertical axis indicates a measured value acquired by each read head, and the horizontal axis indicates a circumferential direction.

In the example shown in FIG. 6, the RRO learning unit 620 disposes the read head 15R1 at the radial position IRP shown in FIG. 2, and disposes the read head 15R2 at the radial position IRP1 located more inwardly than the radial position IRP. When the lateral CTS is equal to or less than the linear correction region, the RRO learning unit 620 simultaneously executes the RRO learning by the read heads 15R1 and 15R2.

When the RRO learning is executed at the learning position different from the correction position in the particular linear correction region, the RRO learning unit 620 executes the processing (hereinafter, referred to as "estimation learning processing") of calculating a linear correction amount based on the correction position and the RRO correction amount acquired at the learning position. For example, when the RRO learning is simultaneously executed by the read heads 15R1 and 15R2 at two learning positions different from the two correction positions in a particular linear correction region, the RRO learning unit 620 calculates two linear correction amounts LCA1 and LCA2 corresponding to each of the correction positions based on the two learning positions and two RRO correction amounts acquired at each of the two learning positions. The linear correction amount LCA1 is, for example, the RRO correction amount corresponding to the correction position on the learning position side of the read head 15R1. The linear correction amount LCA2 is, for example, the RRO correction amount corresponding to the correction position on the learning position side of the read head 15R2. The linear correction amounts LCA1 and LCA2 are expressed by the following Equations.

$$LCA1=(E1-E2)/(px1-px2)\times(cx1-px1)+E1 \quad \text{(Equation 1)}$$

$$LCA2=(E1-E2)/(px1-px2)\times(cx2-px2)+E2 \quad \text{(Equation 2)}$$

Here, px1 is a learning position of the read head 15R1, px2 is a learning position of the read head 15R2, E1 is an RRO correction amount acquired at the learning position px1, and E2 is an RRO correction amount acquired at the learning position px2. In addition, cx1 is a correction position on the learning position px1 side, and cx2 is a correction position on the learning position px2 side. For example, the learning positions px1 and px2 and the correction positions cx1 and cx2 are represented by an offset amount from the center of the width of the linear correction region. The RRO learning unit 620 calculates the RRO correction data (hereinafter, sometimes referred to as linear correction data) LCA1 and LCA2 based on the linear correction amounts LCA1 and LCA2. Further, for example, when the RRO learning is simultaneously executed at one correction position of the particular linear correction region by the read head 15R1 and at the radial position different from the other correction position by the read head 15R2, the RRO learning unit 620 acquires the linear correction amount LCA1 at one correction position by the read head 15R1 and calculates the linear correction amount LCA2 based on the linear correction amount LCA1 and the RRO correction amount acquired by the radial position different from the other correction position. The RRO learning unit 620 may execute the RRO learning at the plurality of learning positions other than the correction position at separate timing by the read head 15R1 or 15R2 and execute the estimation learning processing based on the plurality of learning positions and the plurality of RRO correction amounts acquired at each of the plurality of learning positions. In addition, when the RRO learning is executed at the radial position other than the correction position by three or more read heads in the linear correction region, the RRO learning unit 620 may execute the estimation learning processing based on a function expression expressing three or more learning positions, the RRO correction amounts corresponding to these learning positions, and the change in the RRO in the linear correction region. Further, the RRO learning unit 620 may calculate a sum (hereinafter, referred to as an addition value) of the linear correction data LCA 1 and LCA 2 and a difference (hereinafter, referred to as a subtraction value) therebetween.

When simultaneously executing RRO learning at two correction positions of the particular linear correction region, the RRO learning unit 620 acquires two linear correction amounts. For example, when the RRO learning is simultaneously executed at one correction position of the particular linear correction region by the read head 15R1 and at the other correction position by the read head 15R2, the RRO learning unit 620 acquires the linear correction amount LCA1 at one correction position by the read head 15R1 and acquires the linear correction amount LCA2 at the other correction position by the read head 15R2.

Figure 7:
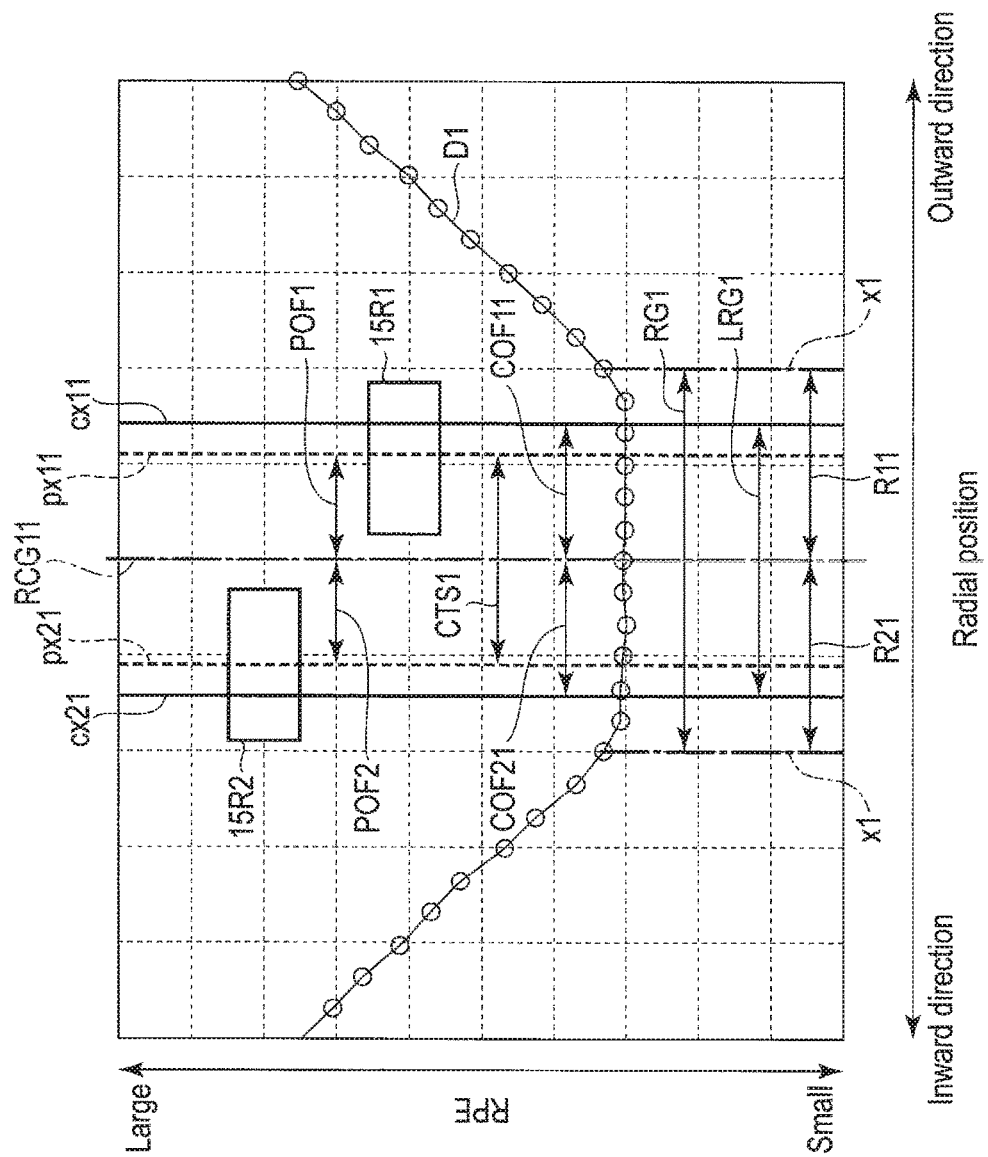
FIG. 7 is a diagram showing an example of estimation learning processing according to an embodiment.

FIG. 7 is a diagram showing an example of estimation learning processing according to the present embodiment. In FIG. 7, a horizontal axis indicates the radial position, and a vertical axis indicates a servo positioning error (repeatable position error (RPE)) when the head positon is corrected based on the RRO correction data which is RRO learned at each radial position. In FIG. 7, a distribution D1 of RPE indicates a change in RPE at each radial position. In each distribution D1 of the RPE, each rounded point indicates measured values of the RPE when the head position is corrected based on the RRO correction data which is RRO learned. The distribution D1 of the RPE is small and constant in the linear possible region RG1, and is larger than the linear possible region RG1 in the region other than the linear possible region RG1. In FIG. 7, the read head 15R1 and the read head 15R2 are located in the linear possible region RG1 of the particular track shown in FIG. 6 and spaced apart from each other by a lateral deviation CTS1. FIG. 7 shows a learning position px11 at which the read head 15R1 is located, a learning position px21 at which the read head 15R2 is located, a correction position cx11 on the learning position px11 side and a correction position cx21 on the learning position px21 side. The correction position cx11 is spaced by a distance COF11 outwardly from a center RCG11 of the linear possible region RG1. The center RCG11 corresponds to a center of a linear correction region LRG1. It is to be noted that the center RCG11 may not correspond to the center of the linear correction region LRG1. The correction position cx21 is spaced by the distance COF21 inwardly from the center RCG11 of the linear possible region RG1. The distance COF11 is the same as the distance COF21. It is to be noted that the distance COF11 may be different from the distance COF21. The learning position px11 is spaced by a distance POF1 inwardly from the center RCG11 of the linear possible region RG1. The learning position px21 is spaced by a distance POF2 inwardly from the center RCG11 of the linear possible region RG1. The distance POF1 and the distance POF2 may be the same or different. In addition, the distance POF1 is smaller than the distance COF11 and the distance POF2 is also smaller than the distance COF21. The distance COF11 is equal to or less than a distance R11 from the center RCG11 of the linear possible region RG1 to the boundary position x1. The distance COF21 is equal to or less than a distance R21 from the center RCG11 of the linear possible region RG1 to the boundary position x2. The distance R11 is the same as the distance R21. It is to be noted that the distance R11 and the distance R21 may be slightly different from each other. In addition, the linear possible region RG1 may also correspond to a width of a particular track. In this case, the center RCG11 corresponds to a track center of a particular track.

In the example shown in FIG. 7, the RRO learning unit 620 determines that the lateral deviation CTS1 in the case in which the read head 15R1 is disposed at the learning position px11 is equal to or less than the linear correction region LRG1 to simultaneously execute the RRO learning in the linear correction regions LRG1 by the read head 15R1 and 15R2. The RRO learning unit 620 executes the estimation learning processing because the learning position px11 does not coincide with the correction position cx11 and the learning position px21 does not coincide with the correction position cx21. The RRO learning unit 620 calculates the linear correction amount LCA1 corresponding to the correction position cx11 and the linear correction amount LCA2 corresponding to the correction position cx21 based on the learning positions px11 (=px1) and px21 (=px2), the correction positions cx11 (=cx1) and cx21 (=cx2), the RRO correction amount (=E1) which is RRO learned at the learning position px11 by the read head 15R1 and the RRO correction amount (=E2) which is RRO learned at the learning position px21 by the read head 15R2, and the above Equations (1) and (2).

Figure 8:
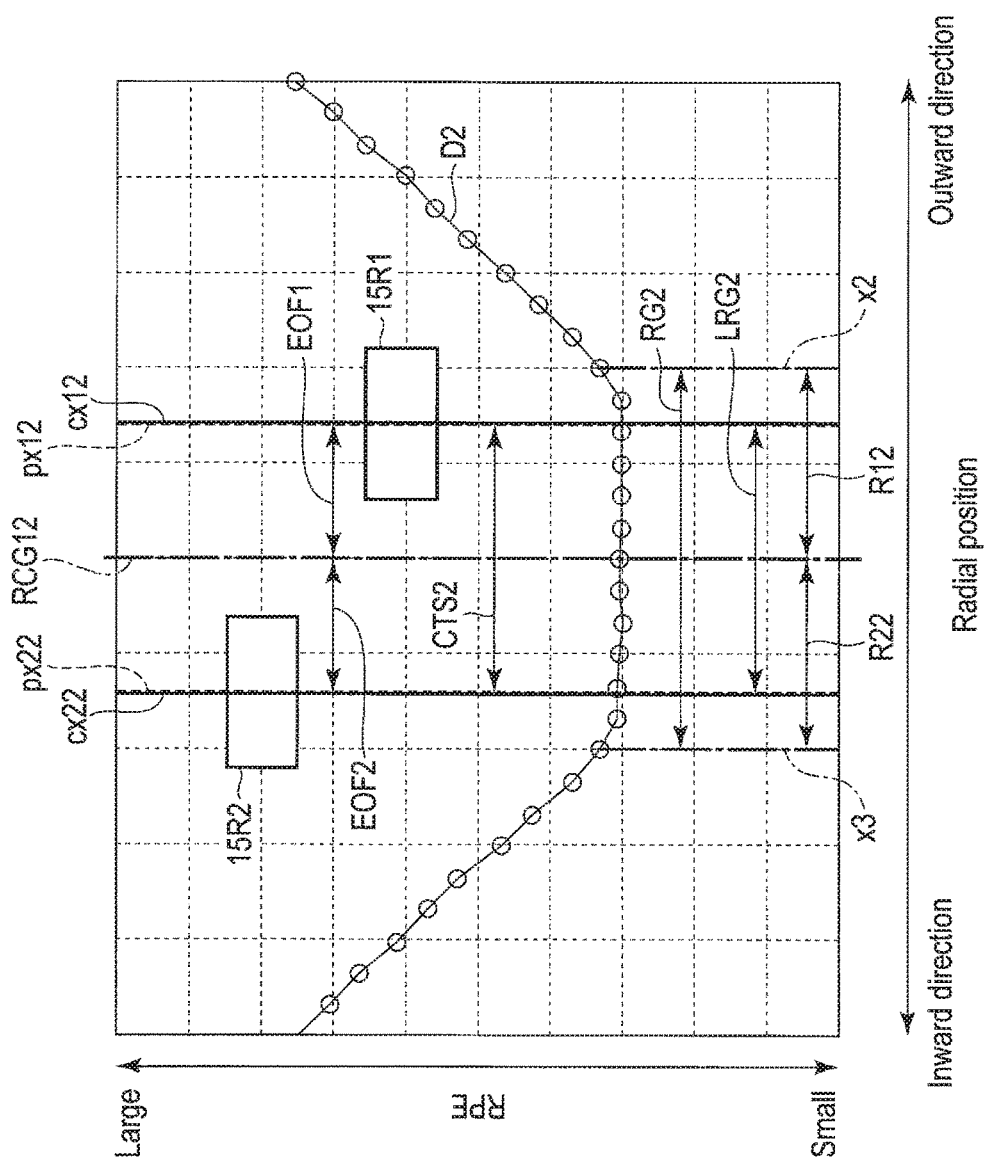
FIG. 8 is a diagram showing an example of RRO learning processing according to an embodiment.

FIG. 8 is a diagram showing an example of the RRO learning processing according to the present embodiment. In FIG. 8, a horizontal axis indicates the radial position, and a vertical axis indicates the RPE when the head position is corrected based on the RRO correction data which is RRO learned at each radial position. In FIG. 8, a distribution D2 of RPE indicates a change in RPE at each radial position. In the distribution D2 of the RPE, each rounded point indicates measured values of the RPE when the head position is corrected based on the RRO correction data which is RRO learned. The distribution D2 of the RPE is small and constant in the linear possible region RG2, and is larger than the linear possible region RG2 in the region other than the linear possible region RG2. In FIG. 8, the read head 15R1 and the read head 15R2 are located in, for example, the linear possible region RG2 shown in FIG. 6 and are spaced apart from each other by the lateral deviation CTS2. FIG. 8 shows a learning position px12 at which the read head 15R1 is located, a learning position px22 at which the read head 15R2 is located, a correction position cx12 on the learning position px12 side, and a correction position cx22 on the learning position px22 side. The correction position cx12 and the learning position px12 are spaced by a distance EOF1 outwardly from a center RCG12 of the linear possible region RG2. The center RCG12 corresponds to a center of a linear correction region LRG2. It is to be noted that the center RCG12 may not correspond to the center of the linear correction region LRG2. The correction position cx22 and the learning position px22 are spaced by a distance EOF2 inwardly from the center RCG12 of the linear possible region RG2. The distance EOF1 is the same as the distance EOF2. It is to be noted that the distance EOF1 may be different from the distance EOF2. The distance EOF1 is equal to or less than a distance R12 from the center RCG12 of the linear possible region RG2 to the boundary position x2. The distance EOF2 is equal to or less than a distance R22 from the center RCG12 of the linear possible region RG2 to the boundary position x3. The distance R12 is the same as the distance R22. It is to be noted that the distance R12 and the distance R22 may be slightly different from each other. In addition, the linear possible region RG1 may also correspond to a width of a particular track. In this case, the center RCG11 corresponds to a track center of a particular track.

In the example shown in FIG. 8, the RRO learning unit 620 determines that the lateral deviation CTS2 in the case in which the read head 15R1 is disposed at the learning position px12 is equal to or less than the linear correction region LRG2 to simultaneously execute the RRO learning in the linear correction regions LRG2 by the read head 15R1 and 15R2. The RRO learning unit 620 acquires the linear correction amount LCA1 at the learning position px12 by the read head 15R1 and acquires the linear correction amount LCA2 at the learning position px22 by the read head 15R2 because the learning position px12 coincides with the correction position cx12 and the learning position px22 coincides with the correction position cx22.

The RRO recording unit 630 positions the head 15 (write head 15W) at a particular radial position and writes the RRO correction data (hereinafter, sometimes referred to as RRObit) acquired by the RRO learning, for example, the linear correction data LCA1 and LCA2 into the particular servo region SV. The RRO recording unit 630 writes at least one RRO correction data into each servo region SV. The RRO recording unit 630 can adjust a readable radial width (hereinafter, referred to as a read width) of the RRO correction data. The RRO recording unit 630 can increase or decrease the read width by, for example, an arrangement interval of the RRO correction data, write conditions (for example, write current or write floating) or the like. In addition, the read width increases or decreases even under design conditions depending on the width of the write head, the width of the read head or the like. It is to be noted that the RRO recording unit 630 may write the addition value and the subtraction value of the linear correction data LCA1 and LCA2 instead of the linear correction data LCA1 and LCA2 into a particular servo region SV. In addition, it is to be noted that the RRO recording unit 630 may write the linear correction data LCA1 and LCA2 and the addition value and the subtraction value of the linear correction data LCA1 and LCA2 into the particular servo region SV.

The RRO recording unit 630 writes the RRO correction data so that the central position (hereinafter, simply referred to as the RRO correction data) of the read width of the RRO correction data is disposed within a particular range (hereinafter, referred to as a permitted range) set in the radial direction from the track center which is permitted to write data onto each track.

FIG. 9 is a diagram showing an example of an arrangement of RRObits according to the present embodiment. In FIG. 9, a particular linear correction region LRG3 is located within a permitted range of a particular track. FIG. 9 shows a track center TRC1 of a particular track, a correction position cx13 spaced by a distance COF12 outwardly from a track center TRC1 and a correction position cx23 spaced by a distance COF22 inwardly from the track center TRC1. The distance COF12 and the distance COF22 may be the same or different. FIG. 9 shows a plurality of servo regions SV and RRObits written into each servo region SV. In addition, servo numbers $2k$, $2k+1$, $2k+2$, $2k+3$, . . . , are attached to the plurality of servo regions SV. For convenience of illustration, FIG. 9 simply shows only the RRObits which are written into the servo region SV, but in actuality, the above-described servo mark, address data, burst data and the like are also written. In addition, in actuality, a user data is written into the plurality of servo regions SV, respectively.

In FIG. 9, a servo region (hereinafter, simply referred to as an odd servo region) having an odd servo number has RRObits arranged at the correction position cx13 and a servo region (hereinafter, simply referred to as an even servo region) having an even servo number has RRObits arranged at the correction position cx23. FIG. 9 shows a servo region SV (2k+1) and a servo region SV (2k+3) as an example of odd servo regions, and shows a servo region SV (2k) and a servo region SV (2k+2) as an example of even servo regions. The servo regions SV (2k), SV (2k+1), SV (2k+2) and SV (2k+3) are arranged in a circumferential direction in order. In actuality, the user data is written into the servo regions SV (2k), SV (2k+1), SV (2k+2) and SV (2k+3), respectively.

The servo region SV (2k) includes RRObit (2k), and the servo region SV (2k+2) includes RRObit (2k+2). The RRObit (2k) includes an RRO correction data LCA2 (2k+1) of the servo region (hereinafter, simply referred to as a subsequent servo region) SV (2k+1) corresponding to a servo number subsequent to the servo region (hereinafter, simply a current servo region) SV (2k) corresponding to a current servo number and an RRO correction data LCA2 (2k+2) of the servo region SV (2k+2) subsequent to the servo region SV (2k+1). The RRO correction data LCA2 (2k+1) corresponds to the correction position cx23 of the servo region SV (2k+1). The RRO correction data LCA2 (2k+2) corresponds to the correction position cx23 of the servo region SV (2k+2). The center (hereinafter, simply referred to as the RRObit) of the read width of the RRObit (2k) is located at the correction position cx23. The RRObit (2k+2) includes an RRO correction data LCA2 (2k+3) of the servo region SV (2k+3) subsequent to the current servo region SV (2k+2) and an RRO correction data LCA1 (2k+4) of the servo region SV (2k+4) subsequent to the servo region SV (2k+3). The RRO correction data LCA2 (2k+3) corresponds to the correction position cx23 of the servo region SV (2k+3). The RRO correction data LCA2 (2k+4) corresponds to the correction position cx23 of the servo region SV (2k+4). The RRObit (2k+2) is located at the correction position cx23. The read widths of the RRObit (2k), RRObit (2k+1), RRObit (2k+2), and RRObit (2k+3) may be the same or different.

The servo region SV (2k+1) includes the RRObit (2k+1), and the servo region SV (2k+3) includes the RRObit (2k+3). The RRObit (2k+1) includes an RRO correction data LCA1 (2k+2) of the servo region SV (2k+2) subsequent to the current servo region SV (2k+1) and an RRO correction data LCA1 (2k+3) of the servo region SV (2k+3) subsequent to the servo region SV (2k+2). The RRObit (2k+1) is located at the correction position cx13. The RRO correction data LCA1 (2k+2) corresponds to the correction position cx13 of the servo region SV (2k+2). The RRO correction data LCA1 (2k+3) corresponds to the correction position cx13 of the servo region SV (2k+3). The RRObit (2k+3) includes an RRO correction data LCA1 (2k+4) of the servo region SV (2k+4) subsequent to the current servo region SV (2k+3) and an RRO correction data LCA1 (2k+5) of the servo region SV (2k+5) subsequent to the servo region SV (2k+4). The RRO correction data LCA1 (2k+4) corresponds to the correction position cx13 of the servo region SV (2k+4). The RRO correction data LCA1 (2k+5) corresponds to the correction position cx13 of the servo region SV (2k+5). The RRObit (2k+3) is located at the correction position cx13.

The RRO recording unit 630 offsets RRObit to be written into the current servo region SV and RRObit to be written into the next servo region SV in opposite directions to each other in the radial direction to write the RRObits. For example, the RRO recording unit 630 writes RRObit in a circumferential direction in zigzag over the plurality of servo regions SV using the track center of the particular track as a base axis. The RRO recording unit 630 writes the RRO correction data corresponding to the next servo region SV learned on the radial position side for writing the RRObit and the RRO correction data corresponding to the next servo region SV after the next into the current servo region SV. In the example shown in FIG. 9, the RRO recording unit 630 writes the RRObit (2k) in the even servo region SV (2k) into the correction position cx23 and writes the RRObit (2k+2) in the even servo region SV (2k+2) into the correction position cx23. In addition, the RRO recording unit 630 writes the RRObit (2k+1) in the odd servo region SV (2k+1) into the correction position cx13 and writes the RRObit (2k+3) in the even servo region SV (2k+3) into the correction position cx13.

FIG. 10 is a diagram showing an example of an arrangement of RRObits according to the present embodiment. FIG. 10 shows a plurality of servo regions SV and RRObits written into each servo region SV. In addition, servo numbers k, k+1, k+2, k+3, . . . , are attached to the plurality of servo regions SV. For convenience of illustration, FIG. 10 simply shows only the RRObits which are written into the servo region SV, but in actuality, the above-described servo mark, address data, burst data and the like are also written. In addition, in actuality, the user data is written into the plurality of servo regions SV, respectively.

In FIG. 10, in the servo region SV, RRObits are arranged in a track center TRC1. FIG. 10 shows a servo region SV (k), a servo region SV (k+1), a servo region SV (k+2) and a servo region (k+3) as an example of the servo regions SV. The servo regions SV (k), SV (k+1), SV (k+2) and SV (k+3) are arranged in a circumferential direction in order. In actuality, the user data is written into the servo regions SV (k), SV (k+1), SV (k+2) and SV (k+3), respectively.

The servo region SV (k) includes RRObit (k), the servo region SV (k+1) includes RRObit (k+1), the servo region SV (k+2) includes RRObit (k+2), and the servo region SV (k+3) includes RRObit (k+3). The RRObit (k) includes an RRO correction data LCA1 (k+1) of a servo region SV (k+1) subsequent to the current servo region SV (k) and an RRO correction data LCA2 (k+1) of a servo region SV (k+1) subsequent to the current servo region SV (k). The RRO correction data LCA1 (k+1) corresponds to the correction position cx13 of the servo region SV (k+1), and the RRO correction data LCA2 (k+1) corresponds to the correction position cx23 of the servo region SV (k+1). The RRObit (k) is located at the track center TRC1.

The RRObit (k+1) includes an RRO correction data LCA1 (k+2) of the servo region SV (k+2) subsequent to the current servo region SV (k+1) and an RRO correction data LCA2 (k+2) of the servo region SV (k+2) subsequent to the current servo region SV (k+1). The RRObit (k+1) is located at the track center TRC1. The RRObit (k+2) includes an RRO correction data LCA1 (k+3) of the servo region SV (k+3) subsequent to the current servo region SV (k+2) and an RRO correction data LCA2 (k+3) of the servo region SV (k+3) subsequent to the current servo region SV (k+2). The RRObit (k+2) is located at the track center TRC1. The RRObit (k+3) includes an RRO correction data LCA1 (k+4) of the servo region SV (k+4) subsequent to the current servo region SV (k+3) and an RRO correction data LCA2 (k+4) of the servo region SV (k+4) subsequent to the current servo region SV (k+3). The RRObit (k+3) is located at the track center TRC1. It is to be noted that the data included in RRObit (k) may be an addition value (=LCA2+LCA1) and a subtraction value (=LCA2−LCA1) of the correction data LCA1 and LCA2.

The RRO recording unit 630 writes the RRObits into the track center in each servo region SV. The RRO recording unit 630 writes an RRO correction data corresponding to the next servo region SV learned at the radial position in the outward direction from the track center and an RRO correction data corresponding to the next servo region SV learned in the radial direction in the inward direction from the track center into the current servo region SV. In the example shown in FIG. 10, the RRO recording unit 630 writes the RRObit (k) into the track center TRC1 in the servo region SV (k), writes the RRObit (k+1) into the track center TRC1 in the servo region SV (k+1), writes the RRObit (k+2) into the track center TRC1 in the servo region SV (k+2), and writes the RRObit (k+3) into the track center TRC1 in the servo region SV (k+3).

It is to be noted that the RRO recording unit 630 is not limited to the arrangement described above, and may write the RRObits in another arrangement.

The position correction unit 640 reads the RRObits (RRO correction data), calculates the RRO correction amount based on the read RRObits, and corrects the head position based on the calculated RRO correction amount, the radial position at which the RRObits are learned or the offset amount from the track center of the track corresponding to the RRObit so that the head position approaches, for example, the track center. The position correction unit 640 calculates the change in the RRO correction amount of the linear correction region based on at least two linear correction amounts and executes the linear RRO correction processing for correcting the head position based on the calculated change in the RRO correction amount. For example, the position correction unit 640 reads the linear correction data (RRObit) LCA1 and LCA2, and calculates the linear correction amount based on the read linear correction data (RRObit) LCA1 and LCA2, the correction positions cx1 and cx2 (or learning positions px1 and px2) of the LCA1 and LCA2, and the offset amount from the target track (track center) of the current head position. For example, when the track center is set to be 0 in the radial direction, the outside is set to be a negative value, and the inside is set to be a positive value, the linear correction amount is divided as the following description based on an offset amount cur_ofs from a target track of the current head position.

cur_ofs<cx13 (further outside than correction position cx13 (or learning position)): linear correction amount=LCA1 cur_ofs>cx23 (further inside than correction position cx23 (or learning position)): linear correction amount=LCA2 cx13<=cur_ofs<=cx23: linear correction amount= (LCA2−LCA1)/(cx23−cx13)*cur_ofs+(LCA2+LCA1)/2

The position correction unit 640 corrects the head position based on the calculated linear correction amount and the two radial positions at which the linear correction data LCA1 and LCA2 are each learned.

FIG. 11 is a flowchart showing an example of a method for correcting a head position according to the present embodiment.

The MPU 60 simultaneously acquires a plurality of RRO correction amounts in a particular linear correction region (B1101). For example, the MPU 60 simultaneously acquires the RRO correction amounts by the read heads 15R1 and 15R2 in a particular linear correction region. The MPU 60 determines whether a learning position is the same as the correction position (B1102). For example, the MPU 60 determines whether the two learning positions of the read heads 15R1 and 15R2 coincide with the two correction positions of the particular linear correction region. If it is determined that the learning position is the same as the correction position (YES in B1102), the MPU 60 proceeds to the processing of B1104. If it is determined that the learning position is not the same as the correction position (NO in B1102), the MPU 60 proceeds to the estimation learning processing (B1103). For example, when the MPU 60 executes the RRO learning at the learning position other than the correction position by the read heads 15R1 and 15R2, the MPU 60 calculates the linear correction amount based on the learning position and the plurality of RRO correction amounts acquired at the learning position. The MPU 60 calculates the linear correction data based on the acquired or calculated linear correction amount (B1104). The MPU 60 writes the calculated linear correction data into a particular arrangement on a particular track (B1105), and ends the processing.

According to the present embodiment, the magnetic disk device 1 includes a head 15 including the write head 15W, the read head 15R1, and the read head 15R2. The magnetic disk device 1 simultaneously acquires two RRO correction amounts in a particular linear correction region by the read heads 15R1 and 15R2. When the two learning positions of the read heads 15R1 and 15R2 do not coincide with the two correction positions of the particular linear correction region, the magnetic disk device 1 calculates two linear correction amounts corresponding to each of the two correction positions based on the two RRO correction amounts acquired by the estimation learning processing. The magnetic disk device 1 calculates the two linear correction data, respectively, based on the two linear correction amounts and writes the calculated two linear correction data into the disk 10. As described above, since the RRO correction amount can be simultaneously acquired by the read heads 15R1 and 15R2, the magnetic disk device 1 can efficiently execute the RRO learning. For this reason, the magnetic disk device 1 can shorten the test time or the like during the manufacturing.

Next, a magnetic disk device according to modified examples and other embodiments will be described. In modified examples and other embodiments, the same parts as those in the above-described embodiment are denoted by the same reference numerals, and the detailed description thereof will be omitted.

(First Modified Example)

A magnetic disk device 1 of the first modified example, RRO learning processing is different from the above-described embodiment.

When simultaneously executing RRO learning by a plurality of read heads, an RRO learning unit 620 corrects an RRO correction amount which is RRO learned by a head (hereinafter, referred to as a non-positioning head) other than a read head (hereinafter, referred to as a positioning head) used for positioning. For example, when simultaneously executing the RRO learning by the read heads 15R1 and 15R2, the RRO learning unit 620 corrects an RRO correction amount E2 (for example, linear correction amount LCA2) which is RRO learned by the read head 15R2 as the non-positioning head to an RRO correction amount CLCA2 (hereinafter, referred to as corrected correction amount). The corrected correction amount CLCA2 is expressed by the following Equation.

$$CLCA2 = E2 - dRHP \qquad \text{(Equation 3)}$$

Here, a delta repeatable head position (dRHP) indicates a difference value between a trajectory of the positioning head and a trajectory of the non-positioning head at a particular radial position. The difference value dRHP is calculated, for example, based on the trajectory of the radial position of the positioning head and the trajectory of the radial position of the non-positioning head, which are acquired when the RRO learning is simultaneously executed by the plurality of heads. The RRO learning unit 620 calculates the linear correction data (hereinafter, referred to as corrected correction data) CLCA2 based on the corrected correction amount CLCA2.

When the read head 15R1 is a non-positioning head and the RRO learning is simultaneously executed by the read heads 15R1 and 15R2, the RRO learning unit 620 corrects the RRO correction amount E1 (for example, linear correction amount LCA1), which is RRO learned, to the corrected correction amount CLCA1 by the read JG head 15R1. The corrected correction amount CLCA1 is expressed by the following Equation.

$$CLCA1 = E1 - dRHP \quad \text{(Equation 4)}$$

The RRO learning unit 620 calculates the linear correction data CLCA1 based on the corrected correction amount CLCA1.

Figure 12:
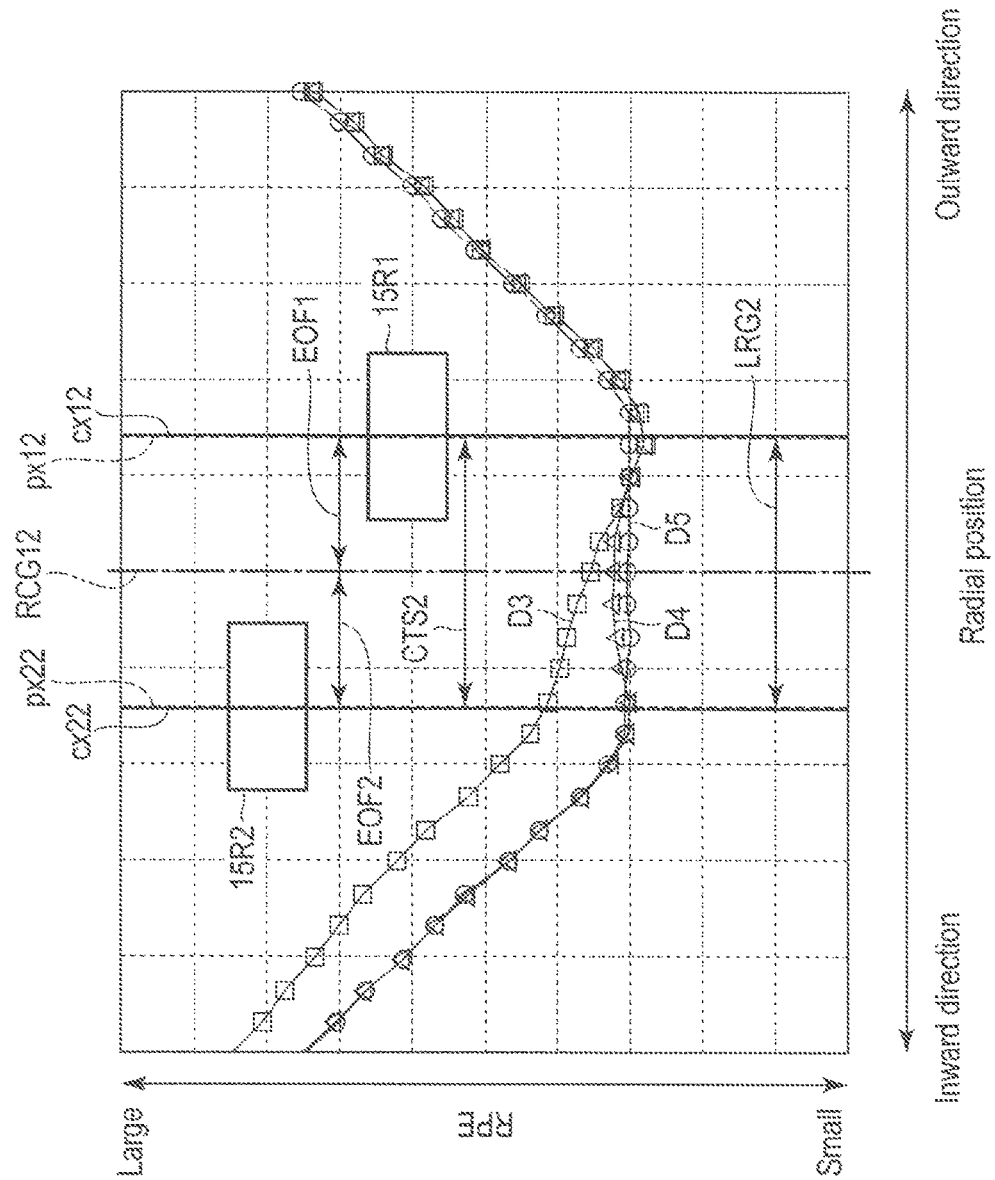
FIG. 12 is a diagram showing an example of the RRO learning processing according to a modified example.

FIG. 12 is a diagram showing an example of the RRO learning processing according to the modified example. In FIG. 12, a horizontal axis indicates the radial position, and a vertical axis indicates RPE when the head position is corrected based on the RRO correction data which is RRO learned at each radial position. In FIG. 12, a distribution D3 of the RPE indicates a change in the RPE at each radial position when the head position is corrected based on an RRO correction data which is not corrected by allowing the non-positioning head to execute the RRO learning and an RRO correction data which is RRO learned by allowing the positioning head to execute the RRO learning. In the distribution D3 of the RPE, each square point indicates a measured value of the RPE when the head position is corrected based on the RRO correction data which is not corrected by allowing the non-positioning head to execute the RRO learning and the RRO correction data which is RRO learned by the positioning head. A distribution D4 of the RPE indicates the change in the RPE at each radial position when the head position is corrected based on the RRO correction data which is corrected by allowing the non-positioning head to execute the RRO learning and the RRO correction data which is RRO learned by the positioning head. In the distribution D4 of the RPE, each triangular point indicates a measured value of the RPE when the head position is corrected based on the RRO correction data which is corrected by allowing the non-positioning head to execute the RRO learning and the RRO correction data which is RRO learned by the positioning head. A distribution D5 of the RPE indicates the change in the RPE at each radial position when the head position is corrected based on the two RRO correction data which are RRO learned at different timings by one read head, for example, the positioning head. In the distribution D5 of the RPE, each rounded point indicates the measured value of the RPE when the head position is corrected based on the two RRO correction data which are RRO learned at different timings by the read head.

In the example shown in FIG. 12, the RRO learning unit 620 determines that the lateral deviation CTS2 in the case in which the read head 15R1 is disposed at the learning position px12 is equal to or less than the linear correction region LRG2 to simultaneously execute the RRO learning in the linear correction regions LRG2 by the read head 15R1 and 15R2. The RRO learning unit 620 acquires the linear correction amount LCA1 at the learning position px12 by the read head 15R1 and acquires the linear correction amount LCA2 at the learning position px22 by the read head 15R2 because the learning position px12 coincides with the correction position cx12 and the learning position px22 coincides with the correction position cx22. The RRO learning unit 620 calculates the corrected correction amount CLCA2 based on the linear correction amount LCA2 which is RRO learned by the read head 15R2 as the non-positioning head and the above Equation (3). In this manner, by correcting the RRO correction amount which is RRO learned by the non-positioning head, the RPE is improved when the head position is corrected as indicated by the distributions D3 to D5 of the RPE.

For example, the RRO recording unit 630 writes the corrected correction data CLCA2 and the linear correction data LCA1 into the particular radial positions, respectively.

For example, the position correction unit 640 reads the linear correction data LCA1 and the corrected correction data CLCA2, and calculates the linear correction amount based on the read linear correction data LCA1 and corrected correction amounts CLCA2, the learning positions cx1 and cx2 of the LCA1 and CLCA2, and the offset amount from the target track of the current head position. The position correction unit 640 corrects the head position based on the two radial positions at which the calculated linear correction amount and linear correction data LCA1 and the corrected correction data CLCA2 are each learned.

Figure 13:
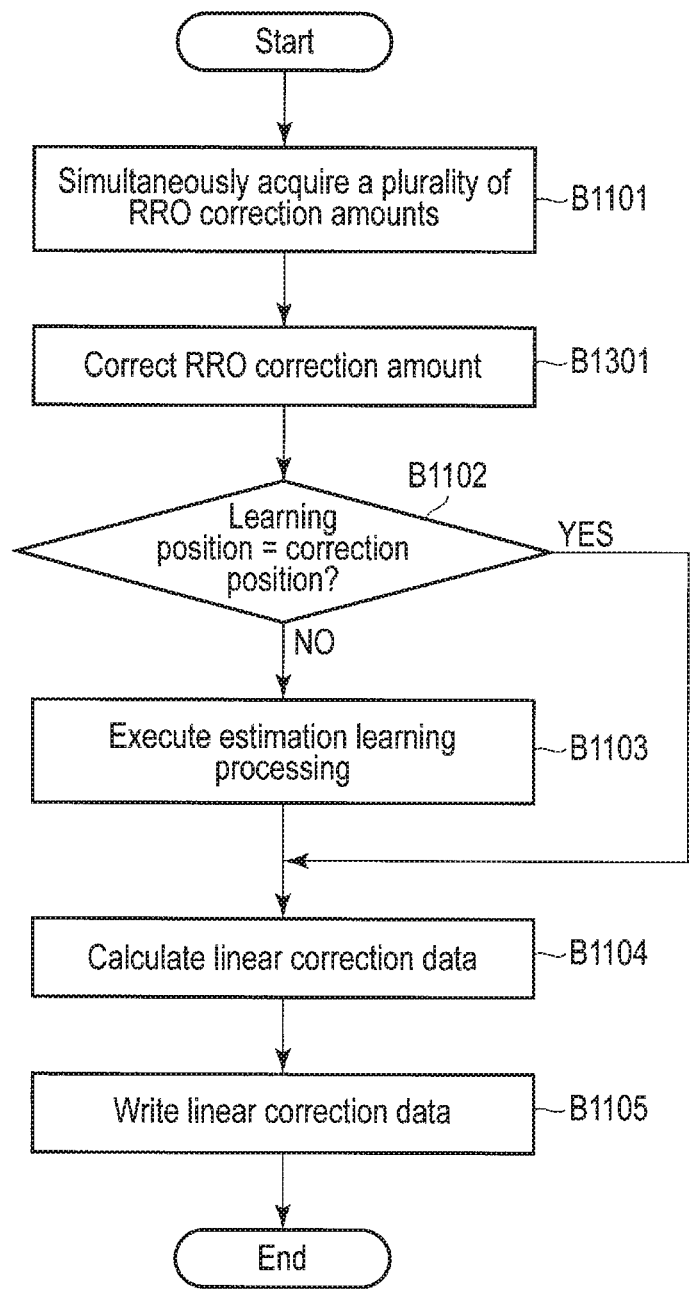
FIG. 13 is a flowchart showing an example of a method for correcting a head position according to a modified example.

FIG. 13 is a flowchart showing an example of a method for correcting a head position according to the modified example.

The MPU 60 simultaneously acquires a plurality of RRO correction amounts in a particular linear correction region (B1101), corrects the RRO correction amount which is RRO learned by the non-positioning head (B1301), and executes the processing of B1102 to B1105. For example, the MPU 60 corrects the RRO correction amount E2 (for example, the linear correction amount LCA2) acquired by the read head 15R2 as the non-positioning head to the corrected correction amount CLCA2.

According to the modified example, the magnetic disk device 1 simultaneously acquires the plurality of RRO correction amounts in the particular linear correction region, and corrects the RRO correction amount, which is RRO learned by the non-positioning head, to the corrected correction amount. The magnetic disk device calculates the two linear correction data, respectively, based on the RRO correction amount which is RRO learned by the positioning head and the corrected correction amount and writes the calculated two linear correction data into the disk 10. Therefore, the magnetic disk device 1 improves the correction accuracy of the head position.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
   a disk comprising a track comprising a plurality of servo sectors;

a head comprising a write head which writes data to the disk and a plurality of read heads which read the data from the disk; and a controller configured to acquire a plurality of pieces of correction data for repeatable runout of the disk in parallel by the read heads, acquire a first correction data and a second correction data based on the correction data, write the first correction data and the second correction data to the disk, and correct a position of the head based on the first correction data and the second correction data, wherein the controller is configured to acquire the correction data at positions other than a first position and a second position in a radial direction of the disk in a first region from the first position to the second position and calculate the first correction data corresponding to the first position and the second correction data corresponding to the second position based on the correction data.

2. The magnetic disk device according to claim 1, wherein the controller is configured to acquire a third correction data at a third position by a first read head among the read heads, acquire a fourth correction data at a fourth position by a second read head among the read heads, calculate the first correction data based on the third position, the fourth position, the third correction data, the fourth correction data, and the first position, and calculate the second correction data based on the third position, the fourth position, the third correction data, the fourth correction data, and the second position.

3. The magnetic disk device according to claim 1, wherein the controller is configured to acquire a third correction data at a third position by a first read head used for positioning of the head among the read heads, acquire a fourth correction data at a fourth position by a second read head which is not used for the positioning of the head among the read heads, correct the fourth correction data to a fifth correction data, calculate the first correction data based on the third position, the fourth position, the third correction data, the fifth correction data and the first position, and calculate the second correction data based on the third position, the fourth position, the third correction data, the fourth correction data and the second position.

4. The magnetic disk device according to claim 3, wherein the controller is configured to calculate a difference value between a first trajectory of the first read head and a second trajectory of the second read head and calculate the fifth correction data based on the fourth correction data and the difference value.

5. The magnetic disk device according to claim 1, wherein the controller is configured to acquire the first correction data at the first position by a first read head among the read heads in the first region and acquire the second correction data at the second position by a second read head among the read heads in the first region.

6. The magnetic disk device according to claim 5, wherein the controller is configured to correct the second correction data acquired by the second read head, which is not used for positioning of the head, to a third correction data and correct the position of the head based on the first correction data and the third correction data.

7. The magnetic disk device according to claim 6, wherein the controller is configured to calculate a difference value between a first trajectory of the first read head and a second trajectory of the second read head and calculate the third correction data based on the second correction data and the difference value.

8. The magnetic disk device according to claim 1, wherein the controller is configured to write the first correction data into the first position in a first servo sector among the servo sectors and write the second correction data into the second position in a second servo sector among the servo sectors.

9. The magnetic disk device according to claim 1, wherein the controller is configured to write the first correction data and the second correction data into a track center of the track in a first servo sector among the servo sectors.

10. A method for correcting a position of a head applied to a magnetic disk device which comprises a disk comprising a track comprising a plurality of servo sectors, a head comprising write head configured to write data to the disk, and a plurality of read heads which read the data from the disk, the method comprising:

acquiring a plurality of pieces of correction data for repeatable runout of the disk in parallel by the read heads;

acquiring a first correction data and a second correction data based on the correction data;

writing the first correction data and the second correction data to the disk;

correcting the position of the head based on the first correction data and the second correction data;

acquiring the correction data at positions other than a first position and a second position in a radial direction of the disk in a first region from the first position to the second position; and calculating the first correction data corresponding to the first position and the second correction data corresponding to the second position based on the correction data.

11. The method for correcting a position of a head according to claim 10, further comprising:

acquiring a third correction data at a third position by a first read head among the read heads;

acquiring a fourth correction data at a fourth position by a second read head among the read heads;

calculating the first correction data based on the third position, the fourth position, the third correction data, the fourth correction data, and the first position; and calculating the second correction data based on the third position, the fourth position, the third correction data, the fourth correction data, and the second position.

12. The method for correcting a position of a head according to claim 10, further comprising:

acquiring a third correction data at a third position by a first read head used for positioning of the head among the read heads;

acquiring a fourth correction data at a fourth position by a second read head which is not used for the positioning of the head among the read heads;

correcting the fourth correction data to a fifth correction data;

calculating the first correction data based on the third position, the fourth position, the third correction data, the fifth correction data and the first position; and calculating the second correction data based on the third position, the fourth position, the third correction data, the fourth correction data and the second position.

13. The method for correcting a position of a head according to claim 12, further comprising:

calculating a difference value between a first trajectory of the first read head and a second trajectory of the second read head; and calculating the fifth correction data based on the fourth correction data and the difference value.

14. The method for correcting a position of a head according to claim 10, further comprising:
  acquiring the first correction data at the first position by a first read head among the read heads in the first region; and
  acquiring the second correction data at the second position by a second read head among the read heads in the first region.

15. The method for correcting a position of a head according to claim 14, further comprising:
  correcting the second correction data acquired by the second read head, which is not used for positioning of the head, to a third correction data; and
  correcting the position of the head based on the first correction data and the third correction data.

16. The method for correcting a position of a head according to claim 15, further comprising:
  calculating a difference value between a first trajectory of the first read head and a second trajectory of the second read head; and
  calculating the third correction data based on the second correction data and the difference value.

17. The method for correcting a position of a head according to claim 10, further comprising:
  writing the first correction data into the first position in a first servo sector among the servo sectors; and
  writing the second correction data into the second position in a second servo sector among the servo sectors.

18. The method for correcting a position of a head according to claim 10, further comprising:
  writing the first correction data and the second correction data into a track center of the track in a first servo sector among the servo sectors.

19. A magnetic disk device, comprising:
  a disk comprising a track comprising a plurality of servo sectors;
  a head comprising a write head which writes data to the disk and a plurality of read heads which read the data from the disk; and
  a controller configured to acquire a plurality of pieces of correction data for repeatable runout of the disk in parallel by the read heads, acquire a first correction data and a second correction data based on the correction data, write the first correction data and the second correction data to the disk, and correct a position of the head based on the first correction data and the second correction data, wherein
  the controller is configured to acquire the first correction data at a first position by a first read head among the read heads in a first region from the first position to a second position in a radial direction of the disk and acquire the second correction data at the second position by a second read head among the read heads, and to correct the second correction data acquired by the second read head, which is not used for positioning of the head, to a third correction data and correct the position of the head based on the first correction data and the third correction data.

* * * * *